US012656600B2

(12) United States Patent
Gu et al.

(10) Patent No.: US 12,656,600 B2
(45) Date of Patent: Jun. 16, 2026

(54) OPTICAL SCANNER NOISE REDUCTION WITH IMPROVED AIR FLOW

(71) Applicant: Innovusion, Inc., Sunnyvale, CA (US)

(72) Inventors: Chen Gu, San Jose, CA (US); Yimin Li, Cupertino, CA (US)

(73) Assignee: SEYOND, INC., Sunnyvale, CA (US)

( * ) Notice: Subject to any disclaimer, the term of this patent is extended or adjusted under 35 U.S.C. 154(b) by 140 days.

(21) Appl. No.: 18/383,459

(22) Filed: Oct. 24, 2023

(65) Prior Publication Data

US 2024/0151961 A1     May 9, 2024

Related U.S. Application Data

(60) Provisional application No. 63/423,452, filed on Nov. 7, 2022.

(51) Int. Cl.
*G02B 26/12*     (2006.01)
*G01S 7/481*     (2006.01)

(52) U.S. Cl.
CPC .......... *G02B 26/121* (2013.01); *G01S 7/4817* (2013.01)

(58) Field of Classification Search
CPC ........................... G02B 26/121; G01S 7/4817
See application file for complete search history.

(56) References Cited

U.S. PATENT DOCUMENTS

| | | |
|---|---|---|
| 3,897,150 A | 7/1975 | Bridges et al. |
| 4,464,048 A | 8/1984 | Farlow |
| 5,006,721 A | 4/1991 | Cameron et al. |
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |

(Continued)

FOREIGN PATENT DOCUMENTS

| | | |
|---|---|---|
| CN | 1677050 A | 10/2005 |
| CN | 204758260 U | 11/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — James A Dudek
(74) *Attorney, Agent, or Firm* — MASCHOFF BRENNAN; Ran Pang; Liang Huang

(57)     ABSTRACT

An optical scanning device for light ranging and detection (LiDAR) is provided. The optical scanning device comprises a rotatable polygon reflector having a plurality of reflective facets. The rotatable polygon reflector is configured to rotate about a first rotation axis in a first rotation direction. The optical scanning device further comprises one or more fluid circulation devices disposed alongside the rotatable polygon reflector or attached to the rotatable polygon reflector. The one or more fluid circulation devices are configured to rotate about a second rotation axis to form a fluid circulation surrounding the plurality of reflective facets of the rotatable polygon reflector. The fluid circulation is at least partially in the first rotation direction.

25 Claims, 18 Drawing Sheets

(56)                References Cited

U.S. PATENT DOCUMENTS

| | | | |
|---|---|---|---|
| 5,657,077 A | 8/1997 | DeAngelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,830,527 B2 | 11/2010 | Chen |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,984,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk et al. |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | van Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,175,405 B2 | 11/2021 | Pacala et al. |
| 11,178,381 B2 | 11/2021 | Pacala et al. |
| 11,190,750 B2 | 11/2021 | Pacala et al. |
| 11,194,048 B1 | 12/2021 | Burbank et al. |
| 11,287,515 B2 | 3/2022 | Pacala et al. |
| 11,422,236 B2 | 8/2022 | Pacala et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bösch |
| 2014/0350836 A1 | 11/2014 | Stettner et al. |
| 2015/0078123 A1 | 3/2015 | Batcheller et al. |
| 2015/0084806 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |

(56) References Cited

U.S. PATENT DOCUMENTS

| | | | |
|---|---|---|---|
| 2015/0355327 A1 | 12/2015 | Goodwin et al. | |
| 2016/0003946 A1 | 1/2016 | Gilliland et al. | |
| 2016/0047896 A1 | 2/2016 | Dussan | |
| 2016/0047900 A1 | 2/2016 | Dussan | |
| 2016/0061655 A1 | 3/2016 | Nozawa | |
| 2016/0061935 A1 | 3/2016 | McCloskey et al. | |
| 2016/0100521 A1 | 4/2016 | Halloran et al. | |
| 2016/0117048 A1 | 4/2016 | Frame et al. | |
| 2016/0172819 A1 | 6/2016 | Ogaki | |
| 2016/0178736 A1 | 6/2016 | Chung | |
| 2016/0226210 A1 | 8/2016 | Zayhowski et al. | |
| 2016/0245902 A1 | 8/2016 | Watnik | |
| 2016/0291134 A1 | 10/2016 | Droz et al. | |
| 2016/0313445 A1 | 10/2016 | Bailey et al. | |
| 2016/0327646 A1 | 11/2016 | Scheim et al. | |
| 2017/0003116 A1 | 1/2017 | Yee et al. | |
| 2017/0153319 A1 | 6/2017 | Villeneuve et al. | |
| 2017/0242104 A1 | 8/2017 | Dussan | |
| 2017/0299721 A1 | 10/2017 | Eichenholz et al. | |
| 2017/0307738 A1 | 10/2017 | Schwarz et al. | |
| 2017/0365105 A1 | 12/2017 | Rao et al. | |
| 2018/0040171 A1 | 2/2018 | Kundu et al. | |
| 2018/0050704 A1 | 2/2018 | Tascione et al. | |
| 2018/0069367 A1 | 3/2018 | Villeneuve et al. | |
| 2018/0152691 A1 | 5/2018 | Pacala et al. | |
| 2018/0156896 A1 | 6/2018 | O'Keeffe | |
| 2018/0158471 A1 | 6/2018 | Vaughn et al. | |
| 2018/0164439 A1 | 6/2018 | Droz et al. | |
| 2018/0188355 A1 | 7/2018 | Bao et al. | |
| 2018/0188357 A1 | 7/2018 | Li et al. | |
| 2018/0188358 A1 | 7/2018 | Li et al. | |
| 2018/0188371 A1 | 7/2018 | Bao et al. | |
| 2018/0210084 A1 | 7/2018 | Zwölfer et al. | |
| 2018/0275274 A1 | 9/2018 | Bao et al. | |
| 2018/0284241 A1 | 10/2018 | Campbell et al. | |
| 2018/0284242 A1 | 10/2018 | Campbell | |
| 2018/0284286 A1 | 10/2018 | Eichenholz et al. | |
| 2018/0329060 A1 | 11/2018 | Pacala et al. | |
| 2018/0359460 A1 | 12/2018 | Pacala et al. | |
| 2019/0025428 A1 | 1/2019 | Li et al. | |
| 2019/0107607 A1 | 4/2019 | Danziger | |
| 2019/0107623 A1 | 4/2019 | Campbell et al. | |
| 2019/0120942 A1 | 4/2019 | Zhang et al. | |
| 2019/0120962 A1 | 4/2019 | Gimpel et al. | |
| 2019/0154804 A1 | 5/2019 | Eichenholz | |
| 2019/0154807 A1 | 5/2019 | Steinkogler et al. | |
| 2019/0212416 A1 | 7/2019 | Li et al. | |
| 2019/0250254 A1 | 8/2019 | Campbell et al. | |
| 2019/0257924 A1 | 8/2019 | Li et al. | |
| 2019/0265334 A1 | 8/2019 | Zhang et al. | |
| 2019/0265336 A1 | 8/2019 | Zhang et al. | |
| 2019/0265337 A1 | 8/2019 | Zhang et al. | |
| 2019/0265339 A1 | 8/2019 | Zhang et al. | |
| 2019/0277952 A1 | 9/2019 | Beuschel et al. | |
| 2019/0310368 A1 | 10/2019 | LaChapelle | |
| 2019/0369215 A1 | 12/2019 | Wang et al. | |
| 2019/0369258 A1 | 12/2019 | Hall et al. | |
| 2019/0383915 A1 | 12/2019 | Li et al. | |
| 2020/0142070 A1 | 5/2020 | Hall et al. | |
| 2020/0256964 A1 | 8/2020 | Campbell et al. | |
| 2020/0271759 A1 | 8/2020 | Hattass et al. | |
| 2020/0284906 A1 | 9/2020 | Eichenholz et al. | |
| 2020/0319310 A1 | 10/2020 | Hall et al. | |
| 2020/0400798 A1 | 12/2020 | Rezk et al. | |
| 2021/0088630 A9 | 3/2021 | Zhang | |

FOREIGN PATENT DOCUMENTS

| CN | 204885804 U | 12/2015 |
|---|---|---|
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705508 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 108594206 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795208 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| CN | 115267727 A | 11/2022 |
| CN | 223296134 U | 9/2025 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2 000 411 A | 1/1979 |
| JP | S5948729 A | 3/1984 |
| JP | 2007144667 A | 6/2007 |
| JP | 2010035385 A | 2/2010 |
| JP | 2017003347 A | 1/2017 |
| JP | 2017138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129408 A1 | 7/2018 |
| WO | 2018/129409 A1 | 7/2018 |
| WO | 2018/129410 A1 | 7/2018 |
| WO | 2018/175990 A1 | 9/2018 |
| WO | 2018/182812 A2 | 10/2018 |
| WO | 2019/079642 A1 | 4/2019 |
| WO | 2019133101 A2 | 7/2019 |
| WO | 2019/165095 A1 | 8/2019 |
| WO | 2019/165289 A1 | 8/2019 |
| WO | 2019/165294 A1 | 8/2019 |
| WO | 2020/013890 A2 | 1/2020 |

OTHER PUBLICATIONS

European Search Report, dated Jul. 17, 2020, for EP Application No. 18776977.3, 12 pages.

European Search Report, dated Jun. 17, 2021, for EP Application No. 18868896.4, 7 pages.

Extended European Search Report, dated Jul. 10, 2020, for EP Application No. 18736738.8, 9 pages.

(56)          References Cited

OTHER PUBLICATIONS

Extended European Search Report, dated Jul. 22, 2020, for EP Application No. 18736685.1, 10 pages.

Fiber laser, Wikipedia, https://en.wikipedia.org/wiki/Fiber_laser, 6 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

Gunzung, Kim, et al. (Mar. 2, 2016). "A hybrid 3D LIDAR imager based on pixel-by-pixel scanning and DS-OCDMA," pp. Proceedings of SPIE [Proceedings of SPIE ISSN 0277-786X vol. 10524], SPIE, US, vol. 9751, pp. 975119-975119-8.

International Preliminary Report on Patentability, dated Apr. 30, 2020, for International Application No. PCT/US2018/056577, 8 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jan. 3, 2019, for International Application No. PCT/US2018/056577, 15 pages.

International Search Report and Written Opinion, dated Jul. 9, 2019, for International Application No. PCT/US2019/018987, 17 pages.

International Search Report and Written Opinion, dated Jun. 7, 2018, for International Application No. PCT/US2018/024185, 9 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

International Search Report and Written Opinion, dated Mar. 23, 2018, for International Application No. PCT/US2018/012704, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Sep. 18, 2018, for International Application No. PCT/US2018/012116, 12 pages.

Mirrors, Physics LibreTexts, https://phys.libretexts.org/Bookshelves/Optics/Supplemental_Modules_(Components)/Mirrors, (2021), 2 pages.

Office Action Issued in Japanese Patent Application No. 2019-536019 dated Nov. 30, 2021, 6 pages.

"Why Wavelengths Matter in Fiber Optics", FirstLight, https://www.firstlight.net/why-wavelengths-matter-in-fiber-optics/, (2021), 5 pages.

International Search Report and Written Opinion, dated Feb. 1, 2024, for International Application No. PCT/US2023/035922, 15 pages.

1026A

1026B

1026C

1026D

OPTICAL SCANNER NOISE REDUCTION WITH IMPROVED AIR FLOW

CROSS-REFERENCE TO RELATED APPLICATIONS

This application claims priority to U.S. Provisional Patent Application Ser. No. 63/423,452, filed Nov. 7, 2022, entitled "LIDAR POLYGON NOISE REDUCTION WITH IMPROVED AIR FLOW," the content of which is hereby incorporated by reference in its entirety for all purposes.

FIELD OF THE TECHNOLOGY

This disclosure relates generally to optical scanning and, more particularly, to an optical scanning device comprising one or more fluid circulation devices for reducing noise and improving fluid flow.

BACKGROUND

Light detection and ranging (LiDAR) systems use light pulses to create an image or point cloud of the external environment. A LiDAR system may be a scanning or non-scanning system. Some typical scanning LiDAR systems include a light source, a light transmitter, a light steering system, and a light detector. The light source generates a light beam that is directed by the light steering system in particular directions when being transmitted from the LiDAR system. When a transmitted light beam is scattered or reflected by an object, a portion of the scattered or reflected light returns to the LiDAR system to form a return light pulse. The light detector detects the return light pulse. Using the difference between the time that the return light pulse is detected and the time that a corresponding light pulse in the light beam is transmitted, the LiDAR system can determine the distance to the object based on the speed of light. This technique of determining the distance is referred to as the time-of-flight (ToF) technique. The light steering system can direct light beams along different paths to allow the LiDAR system to scan the surrounding environment and produce images or point clouds. A typical non-scanning LiDAR system illuminate an entire field-of-view (FOV) rather than scanning through the FOV. An example of the non-scanning LiDAR system is a flash LiDAR, which can also use the ToF technique to measure the distance to an object. LiDAR systems can also use techniques other than time-of-flight and scanning to measure the surrounding environment.

SUMMARY

LiDAR systems that use polygon mirrors as optical scanning devices typically require the polygon mirrors to rotate at a very high speed. For example, a LiDAR system having a polygon mirror with four facets can be required to scan at least 300 scanlines/second at 10 frames/second. This scanning requirement equates to at least 75 rotations/second or 4500 RPMs (round per minute) for the polygon mirror. In some situations, the speed of rotation can be even higher. In a LiDAR system, one or more laser beams are emitted from a light source of the LiDAR system and directed to a polygon mirror for scanning. Each reflective facet of the polygon mirror is generally flat to prevent diverging or widening of the outgoing laser beam angle. This means that the polygon mirror cannot be aerodynamically shaped, and thus may generate significant noise and vibration during its high speed rotation, due to the air drag caused by the flat mirror surfaces imparting vortices and wakes in the air around the polygon mirror. To reduce the air drag caused by the polygon mirror in high speed rotation, and to consequently reduce noise and vibration, the present disclosure describes technologies that place an air flow curtain around the polygon mirror.

In one embodiment, an optical scanning device for light ranging and detection (LiDAR) is provided. The optical scanning device comprises a rotatable polygon reflector having a plurality of reflective facets. The rotatable polygon reflector is configured to rotate about a first rotation axis in a first rotation direction. The optical scanning device further comprises one or more fluid circulation devices disposed alongside the rotatable polygon reflector or attached to the rotatable polygon reflector. The one or more fluid circulation devices are configured to rotate about a second rotation axis to form a fluid circulation surrounding the plurality of reflective facets of the rotatable polygon reflector. The fluid circulation is at least partially in the first rotation direction.

In one embodiment, a light ranging and detection (LiDAR) system comprising an optical scanning device is provided. The optical scanning device comprises a rotatable polygon reflector having a plurality of reflective facets. The rotatable polygon reflector is configured to rotate about a first rotation axis in a first rotation direction. The optical scanning device further comprises one or more fluid circulation devices disposed alongside the rotatable polygon reflector or attached to the rotatable polygon reflector. The one or more fluid circulation devices are configured to rotate about a second rotation axis to form a fluid circulation surrounding the plurality of reflective facets of the rotatable polygon reflector. The fluid circulation is at least partially in the first rotation direction.

In one embodiment, a vehicle comprising a light ranging and detection (LiDAR) system comprising an optical scanning device is provided. The optical scanning device comprises a rotatable polygon reflector having a plurality of reflective facets. The rotatable polygon reflector is configured to rotate about a first rotation axis in a first rotation direction. The optical scanning device further comprises one or more fluid circulation devices disposed alongside the rotatable polygon reflector or attached to the rotatable polygon reflector. The one or more fluid circulation devices are configured to rotate about a second rotation axis to form a fluid circulation surrounding the plurality of reflective facets of the rotatable polygon reflector. The fluid circulation is at least partially in the first rotation direction.

BRIEF DESCRIPTION OF THE DRAWINGS

The present application can be best understood by reference to the embodiments described below taken in conjunction with the accompanying drawing figures, in which like parts may be referred to by like numerals.

DETAILED DESCRIPTION

Figure 1:
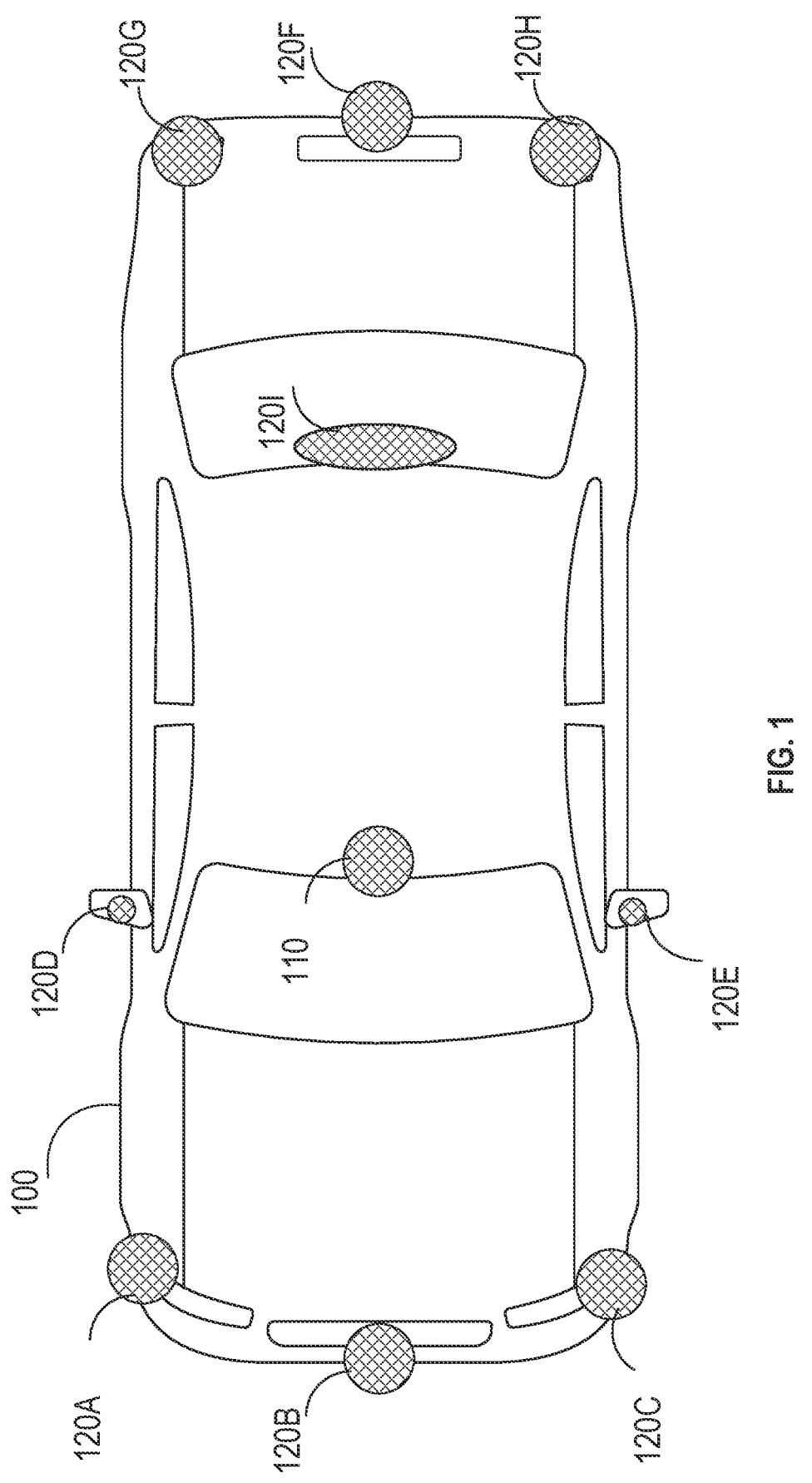
FIG. 1 illustrates one or more example LiDAR systems disposed or included in a motor vehicle.

To provide a more thorough understanding of various embodiments of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices. The components or devices can be optical, mechanical, and/or electrical devices.

Although the following description uses terms "first," "second," etc. to describe various elements, these elements should not be limited by the terms. These terms are only used to distinguish one element from another. For example, a first rotation axis could be termed a second rotation axis and, similarly, a second rotation axis could be termed a first rotation axis, without departing from the scope of the various described examples. The first rotation axis and the second rotation axis can both be rotation axes and, in some cases, can be separate and different rotation axes.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, or any other volatile or non-volatile storage devices). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

LiDAR systems that use polygon mirrors as optical scanners may require the polygon mirrors to rotate at a very high speed. For example, a LiDAR system having a polygon mirror with four facets can be required to scan at least 300 scanlines/second at 10 frames/second. This scanning requirement equates to at least 75 rotations/second or 4500 RPMs (round per minute) for the polygon mirror. In some situations, the speed of rotation can be even higher. In a LiDAR system, one or more laser beams are emitted from a light source of the LiDAR system and directed to a polygon mirror for scanning. Each facet of the polygon mirror is generally flat to prevent diverging or widening of the outgoing laser beam angle. This means that the polygon mirror cannot be aerodynamically shaped, and thus may generate significant noise and vibration during its high speed rotation, due to the air drag caused by the flat mirror surfaces imparting vortices and wakes in the air around the polygon. To reduce the air drag caused by the polygon mirror in high speed rotation, and to consequently reduce noise and vibration, the present disclosure describes technologies that place a fluid flow curtain around a rotatable polygon reflector. The fluid flow (e.g., air flow) curtain reduces the frictions, wakes, vortices around the polygon reflector, and therefore in turn reduces the air drag when the polygon reflector rotates.

In one embodiment, an optical scanning device for light ranging and detection (LiDAR) is provided. The device comprises a rotatable polygon reflector having a plurality of reflective facets. The rotatable polygon reflector is configured to rotate about a first rotation axis in a first rotation direction. The optical scanning device further comprises one or more fluid circulation devices disposed alongside the rotatable polygon reflector or attached to the rotatable polygon reflector. The one or more fluid circulation devices are configured to rotate about a second rotation axis to form a fluid circulation surrounding the plurality of reflective facets of the rotatable polygon reflector. The fluid circulation is at least partially in the first rotation direction.

FIG. 1 illustrates one or more example LiDAR systems 110 and 120A-120I disposed or included in a motor vehicle 100. Vehicle 100 can be a car, a sport utility vehicle (SUV), a truck, a train, a wagon, a bicycle, a motorcycle, a tricycle, a bus, a mobility scooter, a tram, a ship, a boat, an underwater vehicle, an airplane, a helicopter, an unmanned aviation vehicle (UAV), a spacecraft, etc. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-120I. Each of LiDAR systems 110 and 120A-120I can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is a frequently-used sensor of a vehicle that is at least partially automated. In one embodiment, as shown in FIG. 1, motor vehicle 100 may include a single LiDAR system 110 (e.g., without LiDAR systems 120A-120I) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-120I. As shown in FIG. 1, in one embodiment, multiple LiDAR systems 110 and/or 120A-120I are attached to vehicle 100 at different locations of the vehicle. For example, LiDAR system 120A is attached to vehicle 100 at the front right corner; LiDAR system 120B is attached to vehicle 100 at the front center position; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; LiDAR system 120F is attached to vehicle 100 at the back center position; LiDAR system 120G is attached to vehicle 100 at the back right corner; LiDAR system 120H is attached to vehicle 100 at the back left corner; and/or LiDAR system 120I is attached to vehicle 100 at the center towards the backend (e.g., back end of the vehicle roof). It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

In some embodiments, LiDAR systems 110 and 120A-120I are independent LiDAR systems having their own respective laser sources, control electronics, transmitters, receivers, and/or steering mechanisms. In other embodiments, some of LiDAR systems 110 and 120A-120I can share one or more components, thereby forming a distributed sensor system. In one example, optical fibers are used to deliver laser light from a centralized laser source to all LiDAR systems. For instance, system 110 (or another system that is centrally positioned or positioned anywhere inside the vehicle 100) includes a light source, a transmitter, and a light detector, but has no steering mechanisms. System 110 may distribute transmission light to each of systems 120A-120I. The transmission light may be distributed via optical fibers. Optical connectors can be used to couple the optical fibers to each of system 110 and 120A-120I. In some examples, one or more of systems 120A-120I include steering mechanisms but no light sources, transmitters, or light detectors. A steering mechanism may include one or more moveable mirrors such as one or more polygon mirrors, one or more single plane mirrors, one or more multi-plane mirrors, or the like. Embodiments of the light source, transmitter, steering mechanism, and light detector are described in more detail below. Via the steering mechanisms, one or more of systems 120A-120I scan light into one or more respective FOVs and receive corresponding return light. The return light is formed by scattering or reflecting the transmission light by one or more objects in the FOVs. Systems 120A-120I may also include collection lens and/or other optics to focus and/or direct the return light into optical fibers, which deliver the received return light to system 110. System 110 includes one or more light detectors for detecting the received return light. In some examples, system 110 is disposed inside a vehicle such that it is in a temperature-controlled environment, while one or more systems 120A-120I may be at least partially exposed to the external environment.

Figure 2:
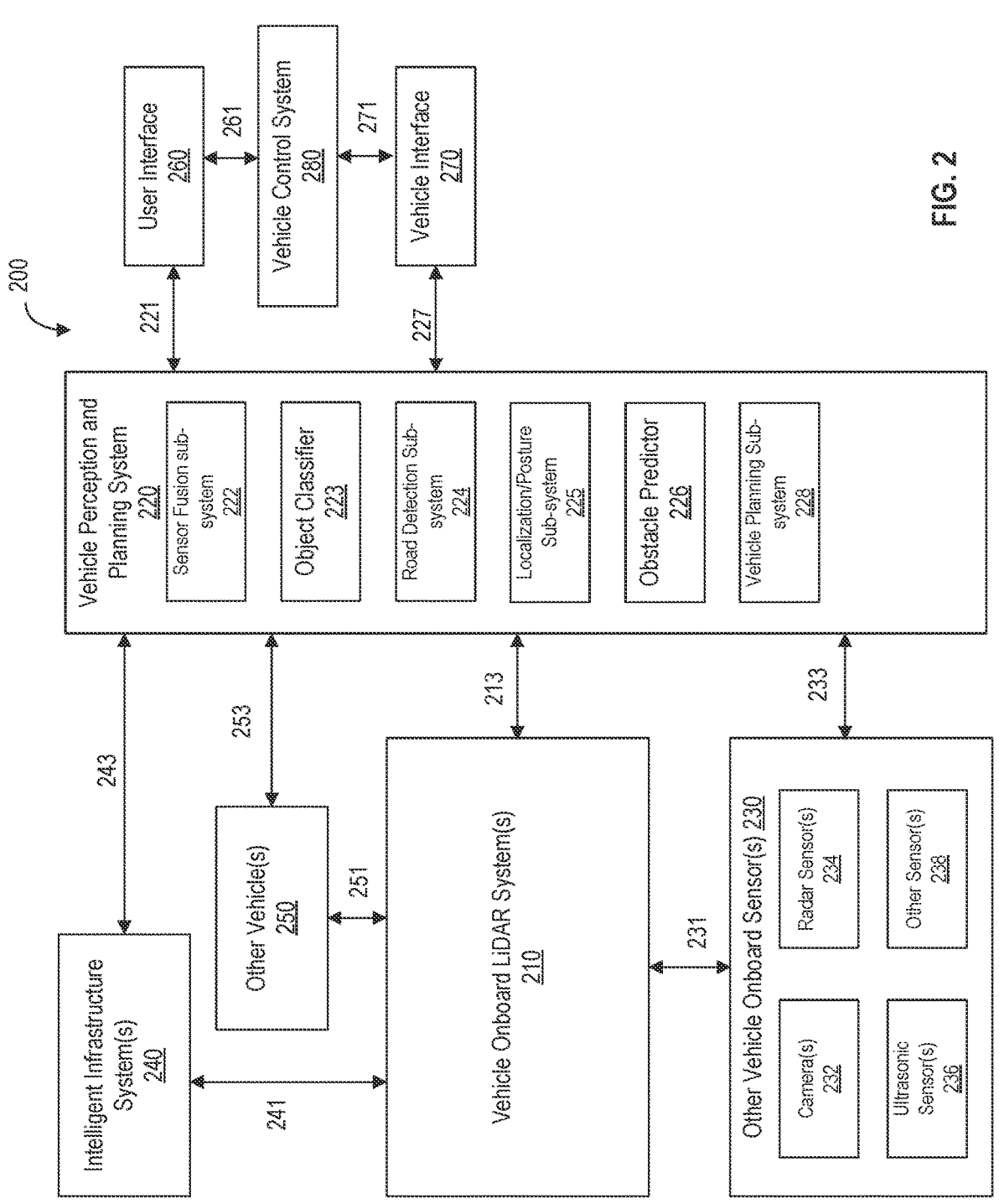
FIG. 2 is a block diagram illustrating interactions between an example LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-50 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 70-200 meters from the LiDAR sensor. Medium-range LiDAR sensors can be used for, e.g., monitoring road intersections, assistance for merging onto or leaving a freeway, or the like. A long-range LiDAR sensor measures objects located up to about 200 meters and beyond. Long-range LiDAR sensors are typically used when a vehicle is travelling at a high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are configured to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera includes image sensors that facilitate producing monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data. Camera(s) 232 can be mounted on, or integrated to, a vehicle at any location (e.g., rear-view mirrors, pillars, front grille, and/or back bumpers, etc.).

Other vehicle onboard sensors(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located near the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium-and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations. Radar sensor(s) 234 can be mounted on, or integrated to, a vehicle at any location (e.g., rear-view mirrors, pillars, front grille, and/or back bumpers, etc.).

Other vehicle onboard sensor(s) 230 can also include ultrasonic sensor(s) 236. Ultrasonic sensor(s) 236 use acoustic waves or pulses to measure objects located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, checking blind spots, identifying parking spaces, providing lane changing assistance into traffic, or the like. Sensor data generated by ultrasonic sensor(s) 236 can also be provided to vehicle perception and planning system 220 via communication path 233 for further processing and controlling the vehicle operations. Ultrasonic sensor(s) 236 can be mount on, or integrated to, a vehicle at any location (e.g., rear-view mirrors, pillars, front grille, and/or back bumpers, etc.).

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud or edge computing service provider for processing and then the processing results can be transmitted back to the vehicle perception and planning system 220 and/or LiDAR system 210).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210 (or with other LiDAR systems located in other vehicles), thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa.

Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffic in the opposite direction. In such a situation, sensors of intelligent infrastructure system(s) 240 can provide useful data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively.

Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can use any computer vision techniques to detect and classify the objects and estimate the positions of the objects. In some embodiments, object classifier 223 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include one or more planners such as a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 227 and 271, which include any wired or wireless communication links that can transfer data.

Vehicle control system 280 controls the vehicle's steering mechanism, throttle, brake, etc., to operate the vehicle according to the planned route and movement. In some examples, vehicle perception and planning system 220 may further comprise a user interface 260, which provides a user (e.g., a driver) access to vehicle control system 280 to, for example, override or take over control of the vehicle when necessary. User interface 260 may also be separate from vehicle perception and planning system 220. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
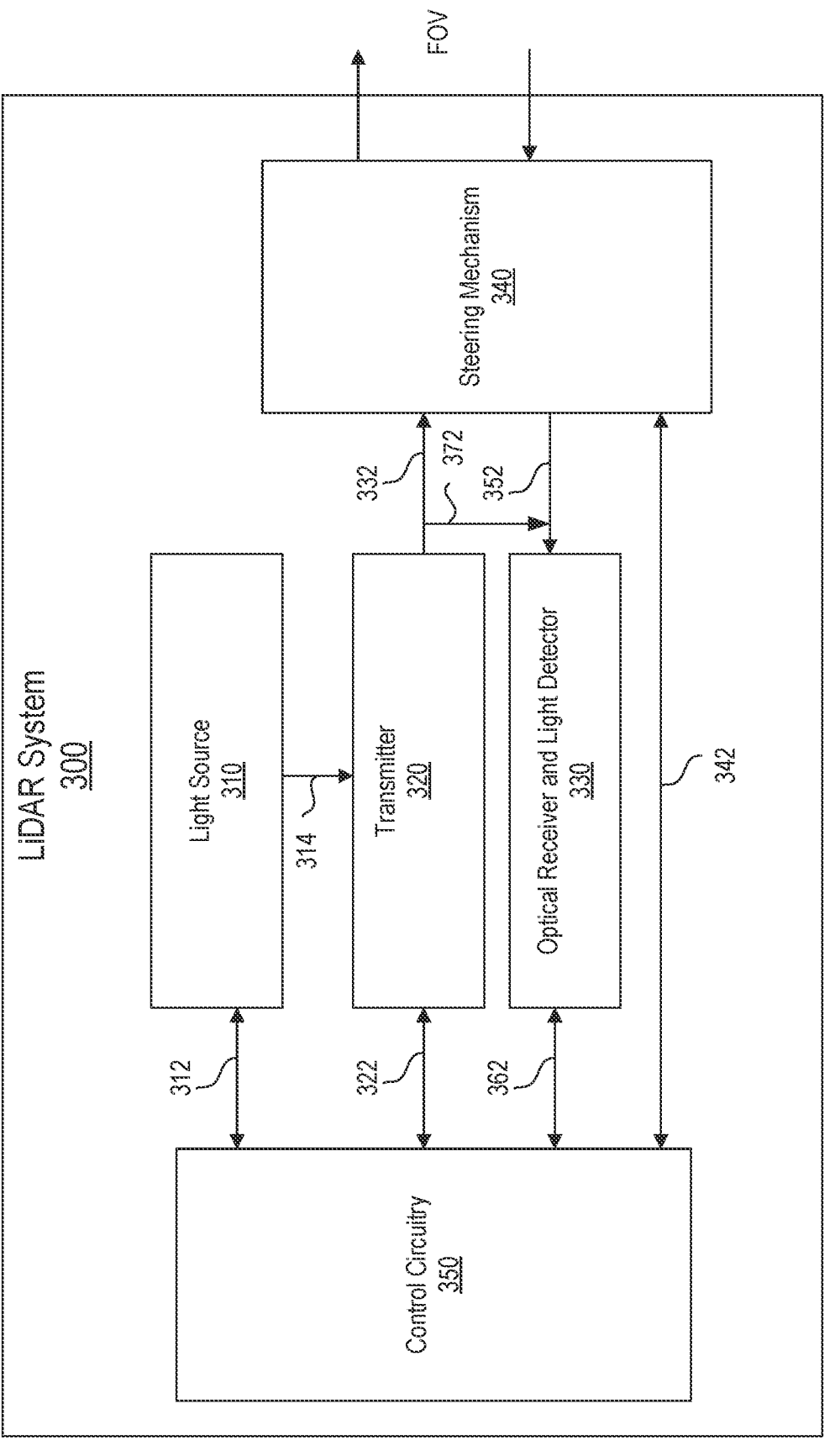
FIG. 3 is a block diagram illustrating an example LiDAR system.

FIG. 3 is a block diagram illustrating an example LiDAR system 300. LiDAR system 300 can be used to implement LiDAR systems 110, 120A-120I, and/or 210 shown in FIGS. 1 and 2. In one embodiment, LiDAR system 300 comprises a light source 310, a transmitter 320, an optical receiver and light detector 330, a steering system 340, and a control circuitry 350. These components are coupled together using communications paths 312, 314, 322, 332, 342, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between light source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

In some embodiments, LiDAR system 300 can be a coherent LiDAR system. One example is a frequency-modulated continuous-wave (FMCW) LiDAR. Coherent LiDARs detect objects by mixing return light from the objects with light from the coherent laser transmitter. Thus, as shown in FIG. 3, if LiDAR system 300 is a coherent LiDAR, it may include a route 372 providing a portion of transmission light from transmitter 320 to optical receiver and light detector 330. Route 372 may include one or more optics (e.g., optical fibers, lens, mirrors, etc.) for providing the light from transmitter 320 to optical receiver and light detector 330. The transmission light provided by transmitter 320 may be modulated light and can be split into two portions. One portion is transmitted to the FOV, while the second portion is sent to the optical receiver and light detector of the LiDAR system. The second portion is also referred to as the light that is kept local (LO) to the LiDAR system. The transmission light is scattered or reflected by various objects in the FOV and at least a portion of it forms return light. The return light is subsequently detected and interferometrically recombined with the second portion of the transmission light that was kept local. Coherent LiDAR provides a means of optically sensing an object's range as well as its relative velocity along the line-of-sight (LOS).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Light source 310 outputs laser light for illuminating objects in a field of view (FOV). The laser light can be infrared light having a wavelength in the range of 700 nm to 1 mm. Light source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), an external-cavity diode laser, a vertical-external-cavity surface-emitting laser, a distributed feedback (DFB) laser, a distributed Bragg reflector (DBR) laser, an interband cascade laser, a quantum cascade laser, a quantum well laser, a double heterostructure laser, or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, light source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, light source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:$YVO_4$) laser crystals. In some examples, light source 310 may have multiple amplification stages to achieve a high power gain such that the laser output can have high power, thereby enabling the LiDAR system to have a long scanning range. In some examples, the power amplifier of light source 310 can be controlled such that the power gain can be varied to achieve any desired laser output power.

Figure 4:
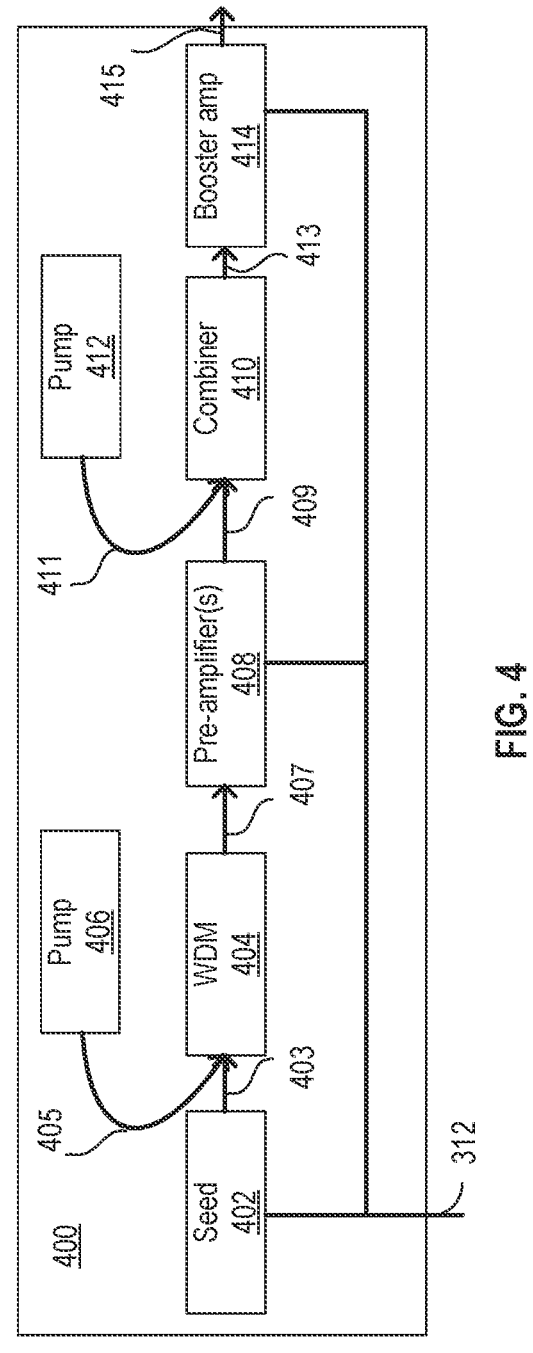
FIG. 4 is a block diagram illustrating an example fiber-based laser source.

FIG. 4 is a block diagram illustrating an example fiber-based laser source 400 having a seed laser and one or more pumps (e.g., laser diodes) for pumping desired output power. Fiber-based laser source 400 is an example of light source 310 depicted in FIG. 3. In some embodiments, fiber-based laser source 400 comprises a seed laser 402 to generate initial light pulses of one or more wavelengths (e.g., infrared wavelengths such as 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 10-30 dB gain). In some embodiments, pre-amplifier(s) 408 are low noise amplifiers. Pre-amplifier(s) 408 output to an optical combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides combined optical signals to a booster amplifier 414, which produces output light pulses via optical fiber 415. The booster amplifier 414 provides further amplification of the optical signals (e.g., another 20-40 dB). The output light pulses can then be transmitted to transmitter 320 and/or steering mechanism 340 (shown in FIG. 3). It is understood that FIG. 4 illustrates one example configuration of fiber-based laser source 400. Laser source 400 can have many other configurations using different combinations of one or more components shown in FIG. 4 and/or other components not shown in FIG. 4 (e.g., other components such as power supplies, lens(es), filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based laser source 400. Fiber-based laser source 400 can also include other components not shown, such as one or more power connectors, power supplies, and/or power lines.

Referencing FIG. 3, typical operating wavelengths of light source 310 comprise, for example, about 850 nm, about 905 nm, about 940 nm, about 1064 nm, and about 1550 nm. For laser safety, the upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from light source 310 can be characterized by its peak power, average power, pulse energy, and/or the pulse energy density. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. In general, the smaller the time interval between the pulses, the higher the PRR. The PRR typically corresponds to the maximum range that a LiDAR system can measure. Light source 310 can be configured to produce pulses at high PRR to meet the desired number of data points in a point cloud generated by the LiDAR system. Light source 310 can also be configured to produce pulses at medium or low PRR to meet the desired maximum detection distance. Wall plug efficiency (WPE) is another factor to evaluate the total power consumption, which may be a useful indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring light source 310 and/or designing laser delivery systems for vehicle-mounted LiDAR applications.

It is understood that the above descriptions provide non-limiting examples of a light source 310. Light source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Light source 310 provides laser light (e.g., in the form of a laser beam) to transmitter 320.

The laser light provided by light source 310 can be amplified laser light with a predetermined or controlled wavelength, pulse repetition rate, and/or power level. Transmitter 320 receives the laser light from light source 310 and transmits the laser light to steering mechanism 340 with low divergence. In some embodiments, transmitter 320 can include, for example, optical components (e.g., lens, fibers, mirrors, etc.) for transmitting one or more laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by light source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the M $2$ factor) is used for measurement of laser beam quality. In many LiDAR applications, it is important to have good laser beam quality in the generated transmitting laser beam. The M $2$ factor represents a degree of variation of a beam from an ideal Gaussian beam. Thus, the M $2$ factor reflects how well a collimated laser beam can be focused on a small spot, or how well a divergent laser beam can be collimated. Therefore, light source 310 and/or transmitter 320 can be configured to meet, for example, a scan resolution requirement while maintaining the desired M $2$ factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. A horizontal dimension can be a dimension that is parallel to the horizon or a surface associated with the LiDAR system or a vehicle (e.g., a road surface). A vertical dimension is perpendicular to the horizontal dimension (i.e., the vertical dimension forms a 90-degree angle with the horizontal dimension). Steering mechanism 340 will be described in more detail below. The laser light scanned to an FOV may be scattered or reflected by an object in the FOV. At least a portion of the scattered or reflected light forms return light that returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focusing, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One example method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structures can be used for a light detector. For example, a light detector structure can be a PIN based structure, which has an undoped intrinsic semiconductor region (i.e., an "i" region) between a p-type semiconductor and an n-type semiconductor region. Other light detector structures comprise, for example, an APD (avalanche photodiode) based structure, a PMT (photomultiplier tube) based structure, a SiPM (Silicon photomultiplier) based structure, a SPAD (single-photon avalanche diode) based structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise. In some embodiments, optical receiver and light detector 330 may include a pre-amplifier that is a low noise amplifier (LNA). In some embodiments, the pre-amplifier may also include a transimpedance amplifier (TIA), which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implementing signal processing techniques (e.g., filtering, noise reduction, amplification, or the like). For example, in addition to, or instead of, using direct detection of return signals (e.g., by using ToF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism, a scanning mechanism, or simply a light scanner. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an example non-scanning LiDAR system).

Steering mechanism 340 can be used with a transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), single-plane or multi-plane mirror(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or multiple scanning devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s), or a combination thereof, for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lenses) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap or completely overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling light source 310 to obtain the desired laser pulse timing, the pulse repetition rate, and power; controlling steering mechanism 340 (e.g., controlling the speed, direction, and/or other parameters) to scan the FOV and maintain pixel registration and/or alignment; controlling optical receiver and light detector 330 (e.g., controlling the sensitivity, noise reduction, filtering, and/or other parameters) such that it is an optimal state; and monitoring overall system health/status for functional safety (e.g., monitoring the laser output power and/or the steering mechanism operating status for safety).

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; derives the reflectivity of an object in the FOV, and/or determines any other type of data relevant to LiDAR system 300.

LiDAR system 300 can be disposed in a vehicle, which may operate in many different environments including hot or cold weather, rough road conditions that may cause intense vibration, high or low humidities, dusty areas, etc. Therefore, in some embodiments, optical and/or electronic components of LiDAR system 300 (e.g., optics in transmitter 320, optical receiver and light detector 330, and steering mechanism 340) are disposed and/or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), fairing(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, buses, or optical fibers, the communication paths can also be wireless channels or open-air optical paths so that no physical communication medium is present. For example, in one example LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
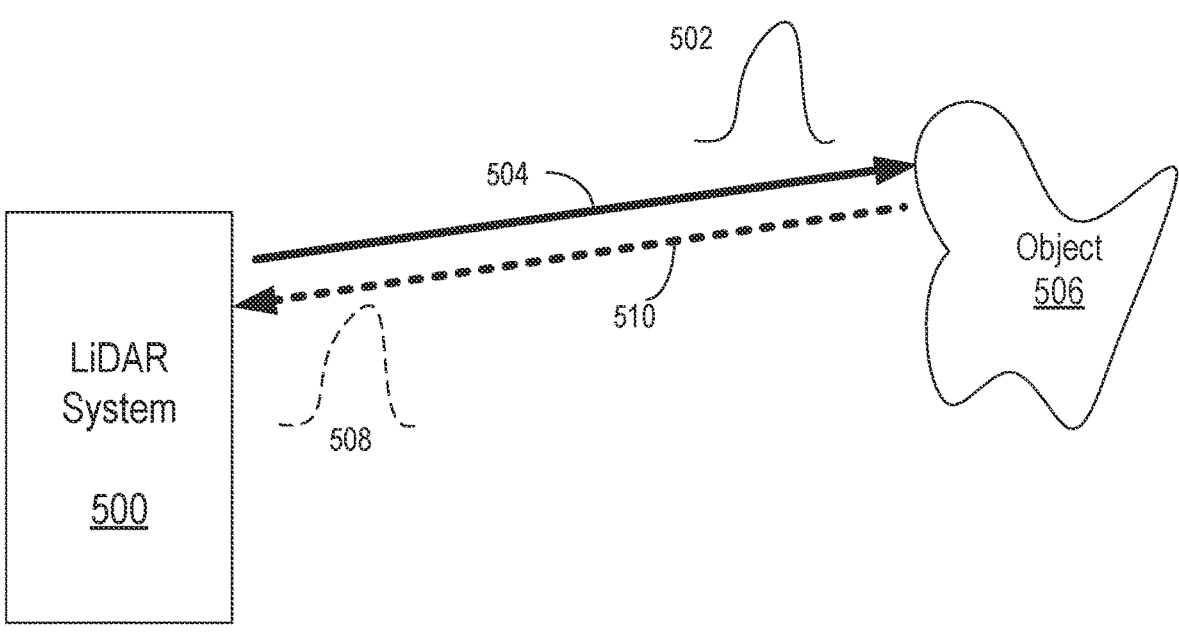
FIGS. 5A-5C illustrate an example LiDAR system using pulse signals to measure distances to objects disposed in a field-of-view (FOV).

As described above, some LiDAR systems use the time-of-flight (ToF) of light signals (e.g., light pulses) to determine the distance to objects in a light path. For example, with reference to FIG. 5A, an example LiDAR system 500 includes a laser light source (e.g., a fiber laser), a steering mechanism (e.g., a system of one or more moving mirrors), and a light detector (e.g., a photodetector with one or more optics). LiDAR system 500 can be implemented using, for example, LiDAR system 300 described above. LiDAR system 500 transmits a light pulse 502 along light path 504 as determined by the steering mechanism of LiDAR system 500. In the depicted example, light pulse 502, which is generated by the laser light source, is a short pulse of laser light. Further, the signal steering mechanism of the LiDAR system 500 is a pulsed-signal steering mechanism. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to form a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figures 5B, 5C:
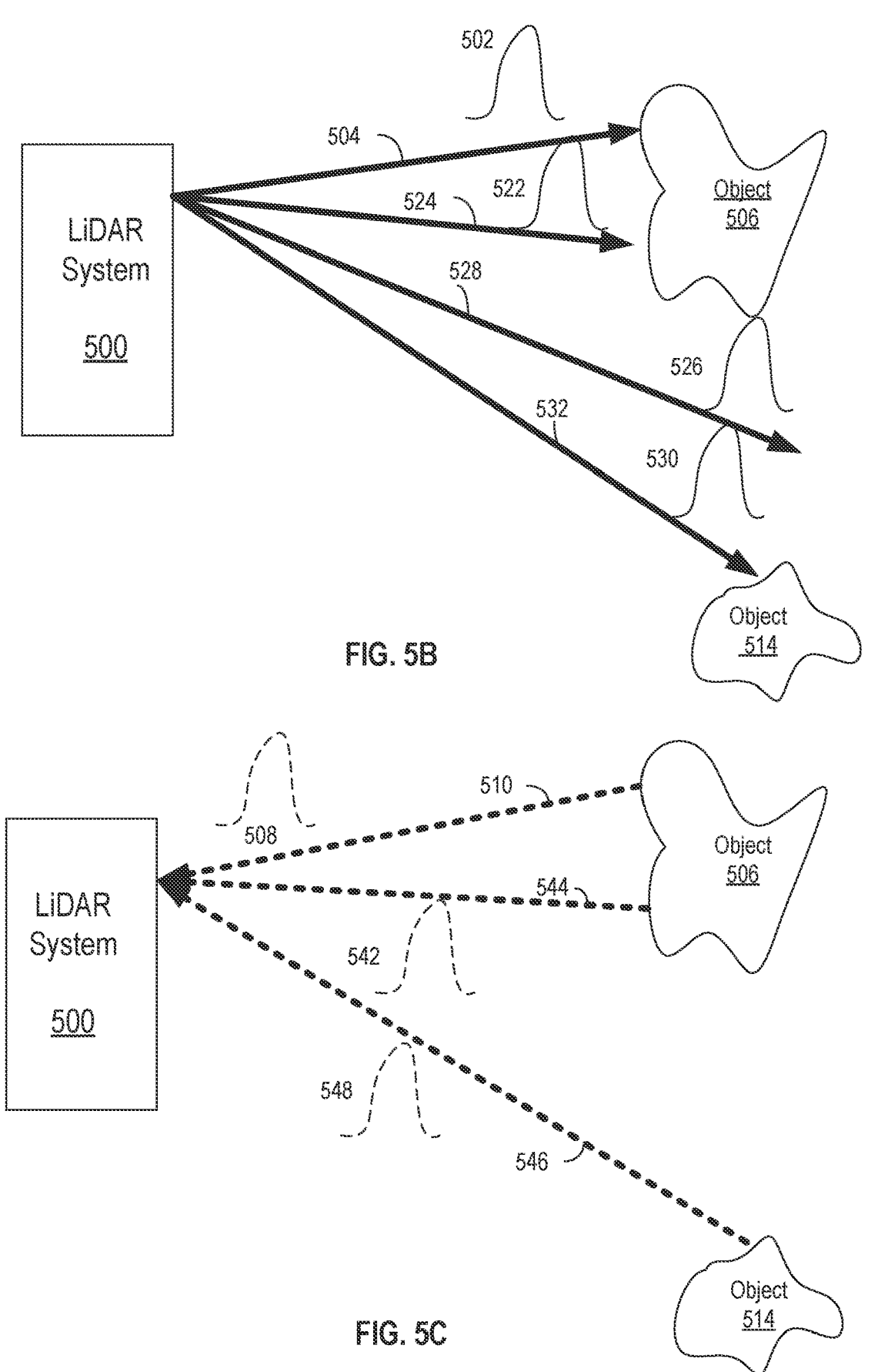

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are formed by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then LiDAR system 500 may determine that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. That is, LiDAR system 500 can be configured to perform a point scan, a line scan, a one-shot without scanning, or a combination thereof. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source in the LiDAR system may have a higher pulse repetition rate (PRR). On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an example LiDAR system that can transmit laser pulses with a pulse repetition rate between 500 kHz and 1 MHz. Based on the time it takes for a pulse to return to the LiDAR system and to avoid mix-up of return pulses from consecutive pulses in a typical LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques (e.g., pulse encoding techniques) are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of at least some of the FIGS. 1-13, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
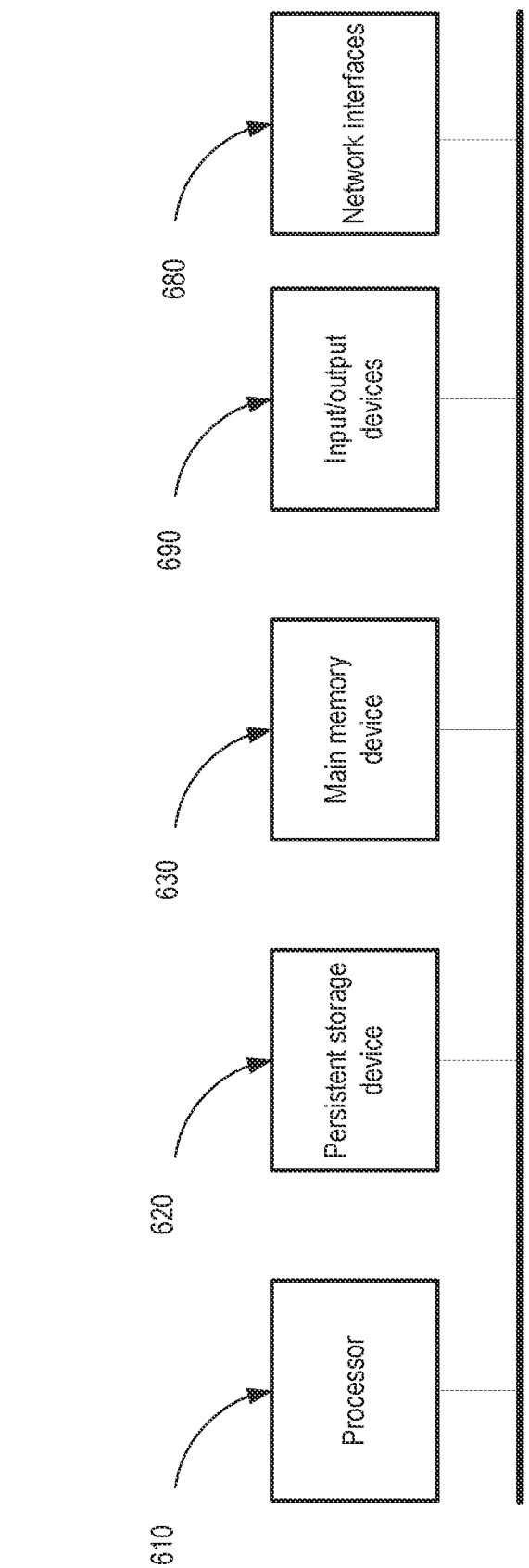
FIG. 6 is a block diagram illustrating an example apparatus used to implement systems, apparatus, and methods in various embodiments.

A high-level block diagram of an example apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps of at least some of FIGS. 1-13 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps discussed herein in connection with at least some of FIGS. 1-13. Accordingly, by executing the computer program instructions, the processor 610 executes an algorithm defined by the method steps of these aforementioned figures. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7:
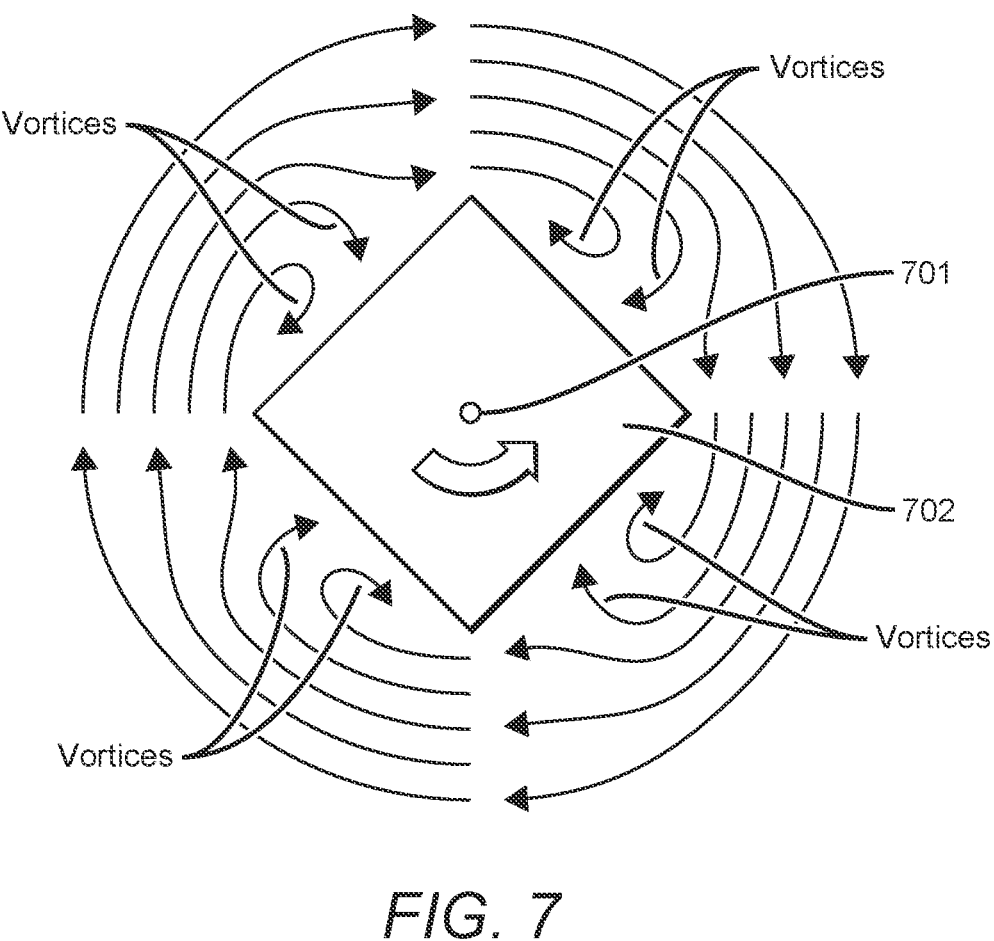
FIG. 7 is a diagram illustrating airflow around a polygon mirror without a fluid circulation device.

FIG. 7 is a diagram illustrating the airflow around a polygon mirror 702 without a fluid circulation device. A polygon mirror may be used in a steering mechanism to scan light for a LiDAR system. As described above, a typical polygon mirror may cause wakes and vortices when it rotates, due to the pressure differences around the edges of the adjacent facets of the polygon mirror. As shown in FIG. 7, polygon mirror 702 has a plurality of facets (e.g., four). A facet refers to the reflective surface of the polygon mirror. A facet is also referred to as a reflective facet. Generally, facets of the polygon mirror are flat reflective surfaces configured to receive and redirect the outgoing transmission light beams and/or incoming return light. As described above, the return light for a LiDAR system may be formed by scattering or reflecting the transmission light beams based on one or more objects in an FOV of the LiDAR system. Typically, a facet of a polygon mirror cannot have a convex and/or concave surface to prevent unintended diverging or converging of the outgoing transmission light beams and/or the incoming return light. Because the polygon mirror facet is generally flat, the edges of the polygon mirror 702 are generally straight edges. As the polygon mirror 702 rotates about an axis 701, the air pressure at the area in front of a polygon facet in the direction of the rotation is high and the air pressure at the area behind a polygon facet is low. As a result of the pressure differences, wakes and vortices are present (as illustrated in FIG. 7), which cause noise and vibration and in turn reduction of the LiDAR performance. The wakes and vortices may be reduced if the polygon mirror can be aerodynamically shaped. But the polygon mirror must also satisfy the optical requirements and therefore cannot be easily altered for aerodynamic purposes. Thus, there is a need for technologies to reduce the noise of the polygon mirror while still satisfying the polygon mirror's optical requirements.

Figure 8A:
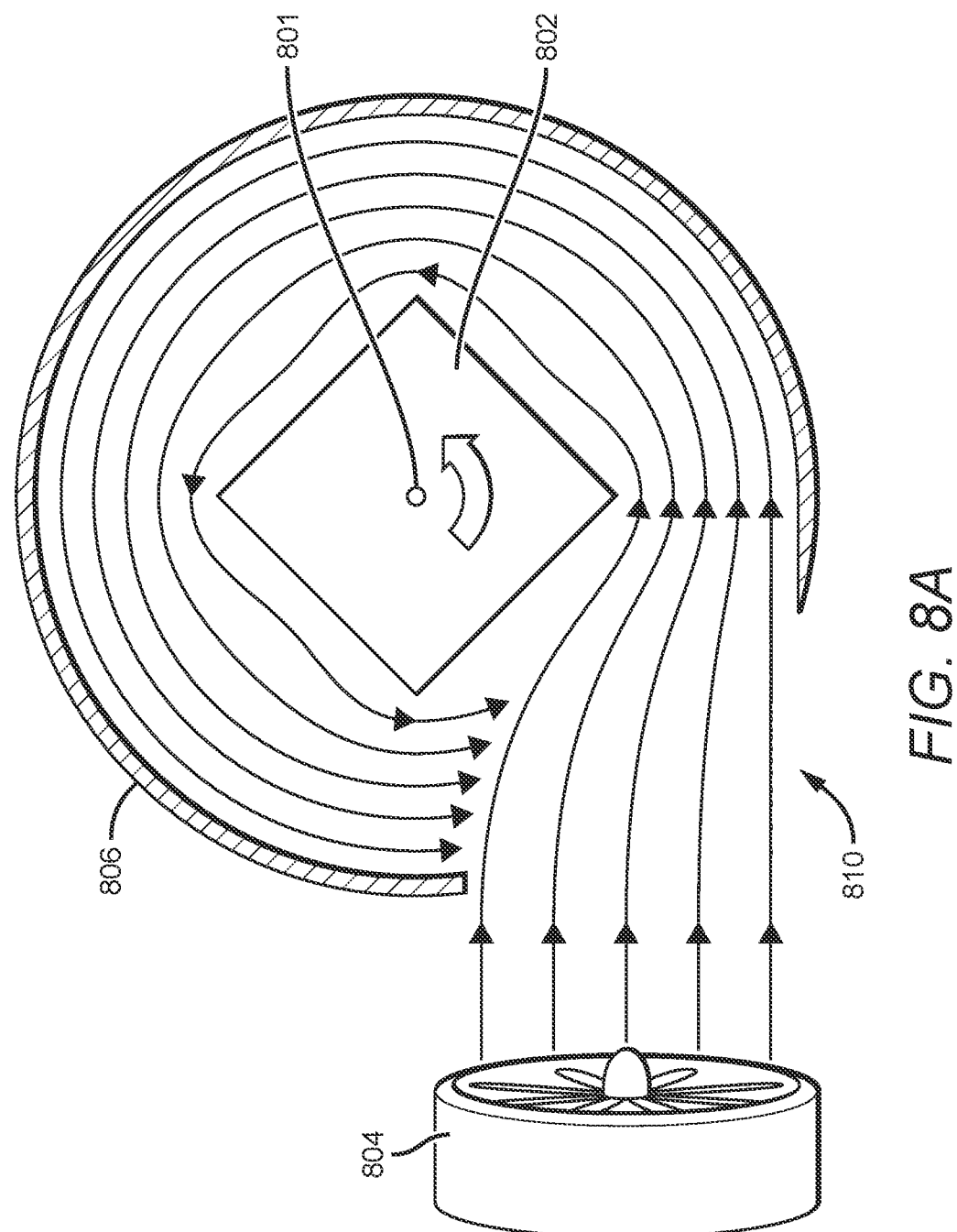
FIG. 8A is a diagram illustrating an example configuration of a rotatable polygon reflector and a fluid circulation device disposed alongside the rotatable polygon reflector to form a fluid circulation surrounding the rotatable polygon reflector, according to some embodiments.
Figure 8B:
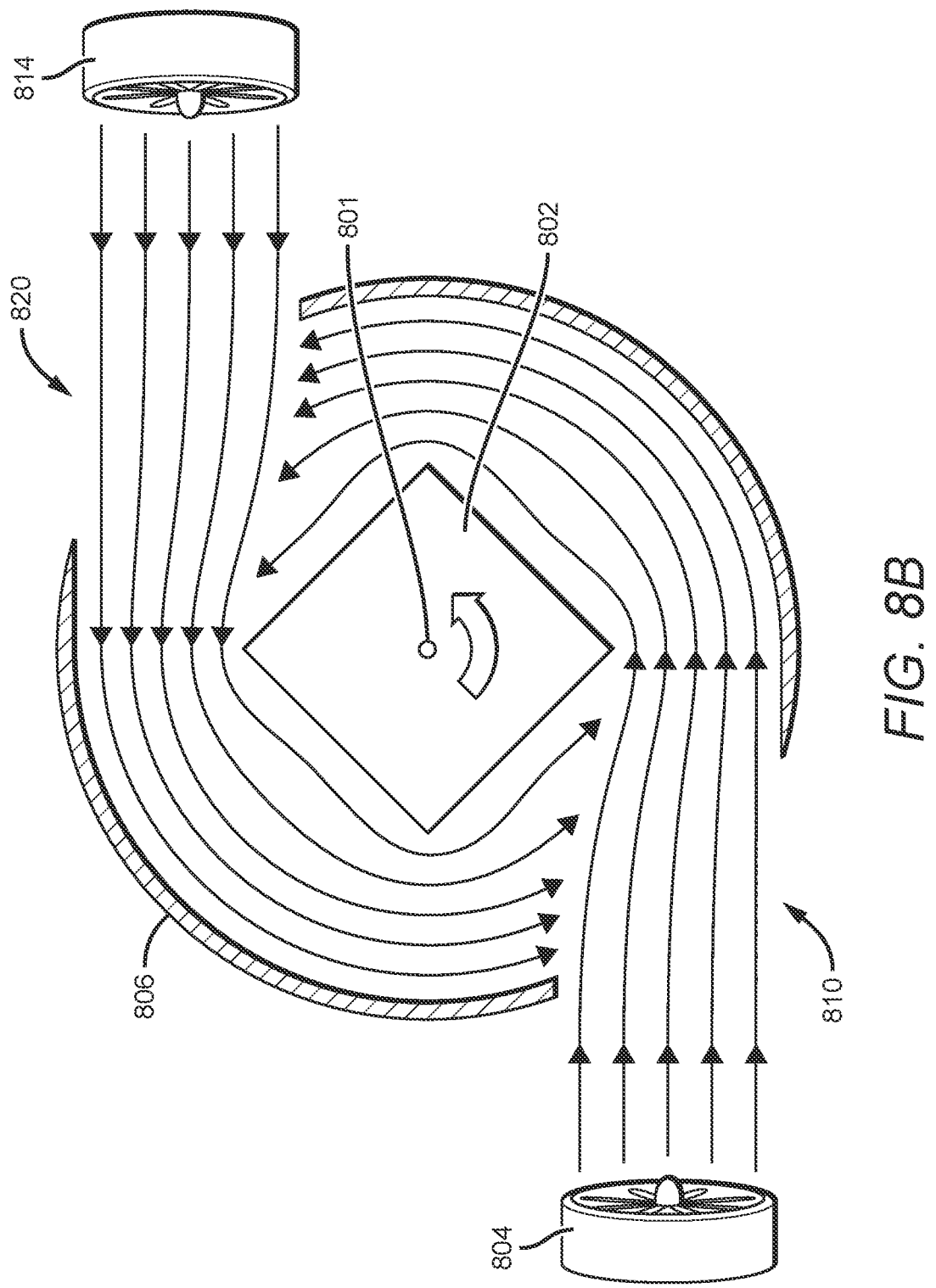
FIG. 8B is a diagram illustrating an example configuration of a rotatable polygon reflector and multiple fluid circulation devices disposed alongside the rotatable polygon reflector to form a fluid circulation surrounding the rotatable polygon reflector, according to some embodiments.
Figure 8C:
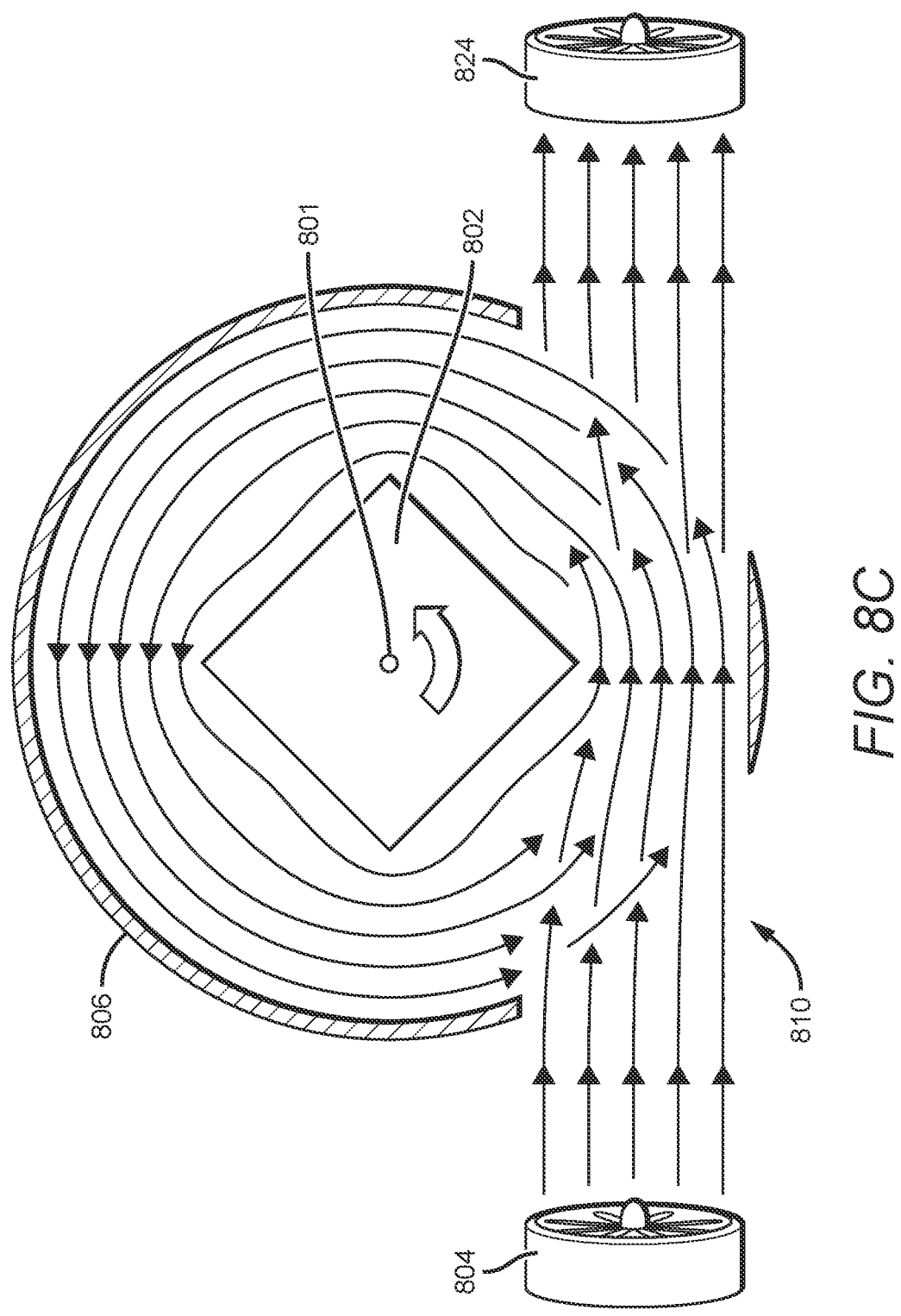
FIG. 8C is a diagram illustrating another example configuration of a rotatable polygon reflector and multiple fluid circulation devices disposed alongside the rotatable polygon reflector to form a fluid circulation surrounding the rotatable polygon reflector, according to some embodiments.

FIG. 8A is a diagram illustrating an example configuration of a rotatable polygon reflector 802 and a fluid circulation device 804 disposed alongside the rotatable polygon reflector 802 to form a fluid circulation surrounding the rotatable polygon reflector 802, according to some embodiments. Polygon reflector 802 can be a part of steering mechanism 340 shown in FIG. 3. It can include a first rotation axial end (e.g., a top end or top surface), a second rotation axial end (e.g., a bottom end or bottom surface), and a plurality of reflective facets (e.g., 4, 5, 6, etc.) disposed between the first and second rotation axial ends. FIGS. 8A-8C show a top view of polygon reflector 802, so only the first rotation axial end (e.g., the top end or top surface) is visible in the FIGS. 8A-8C. The reflective facets of polygon reflector 802 are reflective and configured to scan light to a FOV (or another optics) and receive light from a FOV (or another optics). The first rotational axial end and second rotation axial end of polygon reflector 802 may or may not be reflective. The polygon reflector 802 can rotate about an axis 801 at any desired rotational speed (e.g., 5000, 6000, 7000, 8000, 9000 or higher RPMs). The polygon reflector 802 also has flat reflective facets for redirecting incident light (outgoing or incoming) to the intended directions. To reduce the wakes and vortices when polygon reflector 802 rotates, a fluid circulation device 804 can be placed alongside polygon reflector 802.

FIG. 8A shows a top view of a polygon reflector 802. As shown in FIG. 8A, in one example, polygon reflector 802 can be placed inside a housing 806. In FIG. 8A, housing 806 is shown to have a generally circular shape, cylindrical shape, or spherical shape. The shape of the housing 806 can be configured to smooth the fluid circulation inside housing 806. Housing 806 substantially encloses polygon reflector 802 (and any other associated components such as a motor, an encoder, etc.) except that it has an opening 810 that allows light to pass through the housing 806. Thus, polygon reflector 802 can scan light beams to the FOV (or another optics) via opening 810 and receive return light from the FOV (or another optics). In one example, the opening 810 may not be covered with anything, so that a fluid and light can both pass through without interference. For example, opening 810 may not be covered with a window, such that a fluid flow can be introduced by fluid circulation device 804 via opening 810. Device 804, as shown in FIG. 8A, is disposed outside of housing 806 and is thus detached from polygon reflector 802. Device 804 may include a fan disposed alongside the polygon reflector 802. For instance, the fan can be placed approximately at the same vertical height as, or in the middle of the vertical height of, the reflective facets of the polygon reflector 802. Placing the fan in such a manner may render the fluid flow to be more uniform along the vertical direction of the reflective facets of the polygon reflector 802. In other examples, the fan may be placed close to the first rotation axial end or the second rotation axial end of polygon reflector 802, depending on the specific fluid flow performance requirements.

As shown in FIG. 8A, device 804 is powered and controlled to rotate about its rotation axis (e.g., the axial direction) and moves a fluid toward opening 810. The fluid movable by device 804 (or any other fluid circulation devices described herein) can be air, liquid, gas such as Helium-based gas or Neon-based gas, or a combination thereof. In some examples, the fluid circulation device 804 is configured to direct a fluid to flow via the opening 810 along a tangential direction to the rotation direction of the polygon reflector 802. The rotation direction of polygon reflector 802 is shown in FIG. 8A by the arrow near the rotational axis 801. In FIG. 8A, the rotation direction is counterclockwise viewed from above polygon reflector 802. When polygon reflector 802 rotates about its rotation axis

801, the combination of device 804 and polygon reflector 802 forms a fluid circulation surrounding the reflective facets of the polygon reflector 802, as shown in FIG. 8A. The fluid circulation is at least partially in the rotation direction of the polygon reflector 802, depending on the direction of the fluid being moved by device 804. In some example, the fluid circulation may go from the second rotation axial end of the polygon reflector 802 to the first rotation axial end (e.g., from the bottom end to the top end), from the first rotation axial end of the polygon reflector 802 to the second rotation axial end (e.g., from the top end to the bottom end), or go parallel to the first and/or second rotation axial ends of the polygon reflector 802. The fluid circulation around polygon reflector 802 forms a flow curtain, which can be in the same or similar direction as the rotational direction of polygon reflector 802. As a result, wakes and vortices are reduced or eliminated by this flow curtain. Moreover, the increased fluid flow inside the housing 806 (and thus inside the LiDAR system) may also improve heat dissipation and cooling, further improving the performance of the polygon reflector 802 and the overall performance of the LiDAR system.

FIG. 8B is a diagram illustrating an example configuration of a rotatable polygon reflector 802 and multiple fluid circulation devices disposed alongside the rotatable polygon reflector 802 to form a fluid circulation surrounding the rotatable polygon reflector 802, according to some embodiments. Compared to that in FIG. 8A, the configuration shown in FIG. 8B uses two fluid circulation devices 804 and 814 to form the fluid circulation surrounding the polygon reflector 802. In this configuration, housing 806 has two openings 810 and 820. The fluid circulation devices 804 and 814 are configured to direct fluid flows via the respective openings 810 and 820 along the tangential directions to the rotation direction of the rotatable polygon reflector 802. The rotation direction of polygon reflector 802 is shown in FIG. 8B by the arrow near the rotational axis 801. Similar to the embodiment in FIG. 8A, the rotation direction is counterclockwise viewed from above the polygon reflector 802. When polygon reflector 802 rotates about its rotation axis 801, the combination of devices 804 and 814 and polygon reflector 802 forms a fluid circulation surrounding the reflective facets of the polygon reflector 802. The fluid circulation is at least partially in the rotation direction of the polygon reflector 802, depending on the direction of the fluid being moved by devices 804 and 814. In some examples, the fluid circulation may go from the second rotation axial end of the polygon reflector 802 to the first rotation axial end (e.g., from the bottom end to the top end), from the first rotation axial end of the polygon reflector 802 to the second rotation axial end (e.g., from the top end to the bottom end), or parallel to the first and/or second rotation axial ends of the polygon reflector 802. The fluid circulation around polygon reflector 802 may form a flow curtain. The fluid may circulate around polygon reflector 802 in at least partially the same direction as the rotational direction of polygon reflector 802. As a result, wakes and vortices are reduced or eliminated by this flow curtain.

Compared to the configuration of FIG. 8A, which uses one fluid circulation device 804, the configuration of FIG. 8B uses an additional fluid circulation device 814 to form an enhanced and more uniform fluid circulation around polygon reflector 802. Multiple devices 804 and 814 may also reduce the rotation speed requirements for each fluid circulation device to form a required fluid circulation around polygon reflector 802. Moreover, the enhanced fluid flow inside the housing 806 (and thus inside the LiDAR system)

may also improve heat dissipation and cooling, further improving the performance of the polygon reflector 802 and the LiDAR system. In one embodiment, fluid circulation devices 804 and 814 can both be fans disposed alongside the reflective facets of the polygon reflector 802. The fans can be spaced apart from each other evenly along the perimeter of the housing 806 (e.g., located at opposite positions with respect to polygon reflector 802), or at any desired positions near housing 806. It is understood that while FIG. 8B shows two fluid circulation devices 804 and 814, any number of fluid circulation devices can be used as desired. However, if many fluid circulation devices are used, the housing 806 may have many openings (or in an extreme case, housing 806 is removed). This may result in an increase of air vortices and wakes, and extra noise. Thus, too many fluid circulation devices may not be desirable, and there may be an optimal number of fluid circulation devices for reducing polygon reflector noise and for improving heat dissipation.

FIG. 8C is a diagram illustrating another example configuration of a rotatable polygon reflector 802 and multiple fluid circulation devices disposed alongside the rotatable polygon reflector 802 to form a fluid circulation surrounding the rotatable polygon reflector 802, according to some embodiments. Similar to the configuration shown in FIG. 8B, multiple fluid circulation devices 804 and 824 are used to form a fluid circulation flow surrounding polygon reflector 802. Devices 804 and 824 can be, for example, fans. In this configuration shown in FIG. 8C, device 804 is disposed alongside the reflective facets of the polygon reflector 802 and configured to direct a fluid flow via the opening 810 along a tangential direction to the rotation direction of the rotatable polygon reflector 802. The rotation direction of polygon reflector 802 is shown in FIG. 8C by the arrow near the rotational axis 801. As shown in FIG. 8C, device 804 is disposed on one side of opening 810 to direct a fluid (e.g., blow air) to flow into housing 806. Thus, device 804 is placed similar to the configurations shown in FIGS. 8A and 8B.

In the configuration shown in FIG. 8C, an additional fluid circulation device 824 is disposed on the other side of opening 810 such that it can direct fluid to flow out (e.g., suck out the fluid) from housing 806. In this manner, when polygon reflector 802 rotates about its rotation axis 801, the combination of devices 804, 824, and polygon reflector 802 forms a fluid circulation surrounding the reflective facets of the polygon reflector 802. The fluid circulation is at least partially in the rotation direction of the polygon reflector 802, depending on the direction of the fluid being moved by devices 804 and 824. In some examples, the fluid circulation may go from the second rotation axial end of the polygon reflector 802 to the first rotation axial end (e.g., from the bottom end to the top end), from the first rotation axial end of the polygon reflector 802 to the second rotation axial end (e.g., from the top end to the bottom end), or parallel to the first and/or second rotation axial ends of the polygon reflector 802. The fluid circulation around polygon reflector 802 may form a flow curtain. The fluid may circulate around polygon reflector 802 in at least partially the same direction as the rotational direction of polygon reflector 802.

In the configuration shown in FIG. 8C, the additional fluid circulation device 824 directs fluid to flow out of housing 806, while fluid circulation device 804 directs the fluid to flow into housing 806. As a result, device 804 and device 802 together create a more efficient and smooth fluid flow around polygon reflector 802. This configuration can therefore improve the smoothness and efficiency of the fluid circulation around polygon reflector 802 inside housing 806, thereby further reducing the vortices and wakes. It also further improves the fluid circulation speed, reduces polygon reflector noise, and improves the efficiency of dissipating heat from the LiDAR system.

Figure 9A:
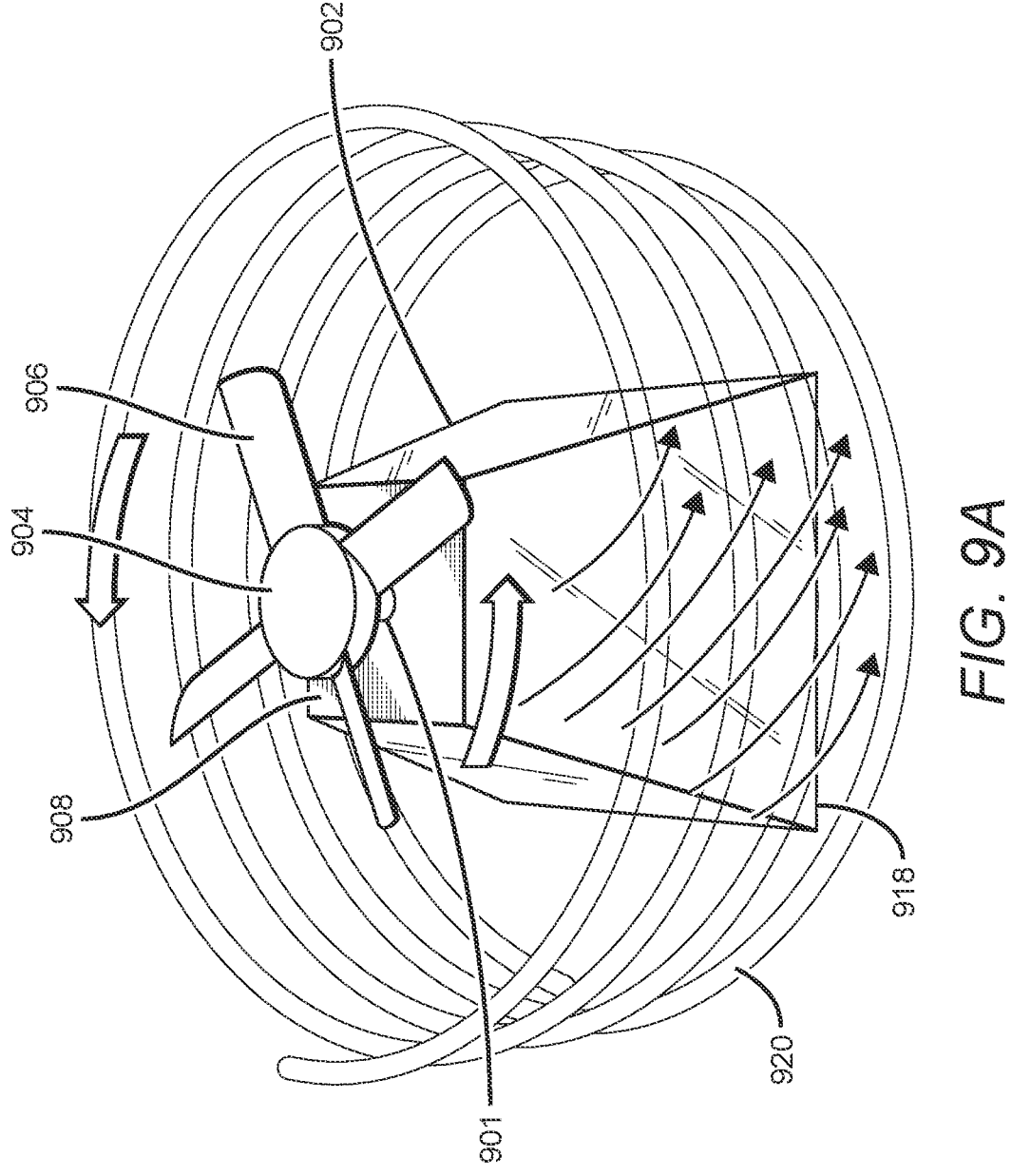
FIG. 9A is a diagram illustrating an example configuration of a rotatable polygon reflector and a fluid circulation device attached to the rotatable polygon reflector to form a fluid circulation surrounding the rotatable polygon reflector, according to some embodiments.

FIGS. 8A-8C illustrate configurations where the fluid circulation device(s) are placed alongside, and detached from, the rotational polygon reflector. FIG. 9A is a diagram illustrating an example configuration of a rotatable polygon reflector 902 and a fluid circulation device 904 attached to the rotatable polygon reflector 902 to form a fluid circulation surrounding the rotatable polygon reflector 902, according to some embodiments. As shown in FIG. 9A, instead of placing a detached fluid circulation device on the side, polygon reflector 902 has a fluid circulation device 904 mounted on a first rotation axial end 908 (e.g., the top end or top surface of polygon reflector 902). Fluid circulation device 904 can be a fan with a plurality of blades (e.g., four as shown in FIG. 9A). Device 904 is attached to the first rotation axial end 908 via a polygon motor axle 901 of polygon reflector 902. The polygon motor axle 901 can be a part of a polygon motor controlled (e.g., by a control circuitry 350) to rotate the polygon reflector 902 and fluid circulation device 904. The fluid circulation device 904 can be rotated in the same direction as that of the polygon reflector 902. In some embodiments, polygon reflector 902 and fluid circulation device 904 have the same rotational axis. In some embodiments, they have different axes. The rotational speeds of the polygon reflector 902 and device 904 may or may not be the same. The rotation of device 904 and the rotation of polygon reflector 902 can be controlled independently or synchronously. For example, the rotation speed of the fluid circulation device 904 can be a multiplication or a fraction of the rotation speed of polygon reflector 902, and may or may not be synchronized with polygon reflector 902.

As shown in FIG. 9A, in this configuration, device 904 can be a fan comprising a plurality of blades 906 (e.g., four blades). The number of blades of a fluid circulation device may or may not be the same as the number of reflective facets of a polygon reflector. At least one of the plurality of blades 906 of device 904 is configured to tilt at an angle such that the fluid circulation forms a cyclonic flow 920 from first rotation axial end 908 of the rotatable polygon reflector 902 to a second rotation axial end 918 of the rotatable polygon reflector 902, as indicated by the arrows pointing to the right and from axial end 908 to axial end 918 (i.e., from top left to bottom right). FIG. 9A shows that all blades 906 of device 904 have a tilt angle configured to form the downward cyclonic flow 920. The tilt angles can be customized to any desired value. The tilt angles of blades 906 also affect the horizontal and vertical components of cyclonic flow 920. For instance, when tilt angles of blades 906 increase, the vertical component of cyclonic flow 920 may also become larger, resulting in a more rapid downward cyclonic flow 920. If the tile angles decrease, the vertical component becomes smaller, and the cyclonic flow 920 moves downward more slowly. Other than the blade tilt angle, it is understood that other characteristics of the fluid circulation device 904 can be configured as desired. These characteristics include, for example, a rotational speed, a rotational direction, a blade angle, blade dimensions, a quantity of blades, and a material of the fluid circulation device 904.

Figure 9B:
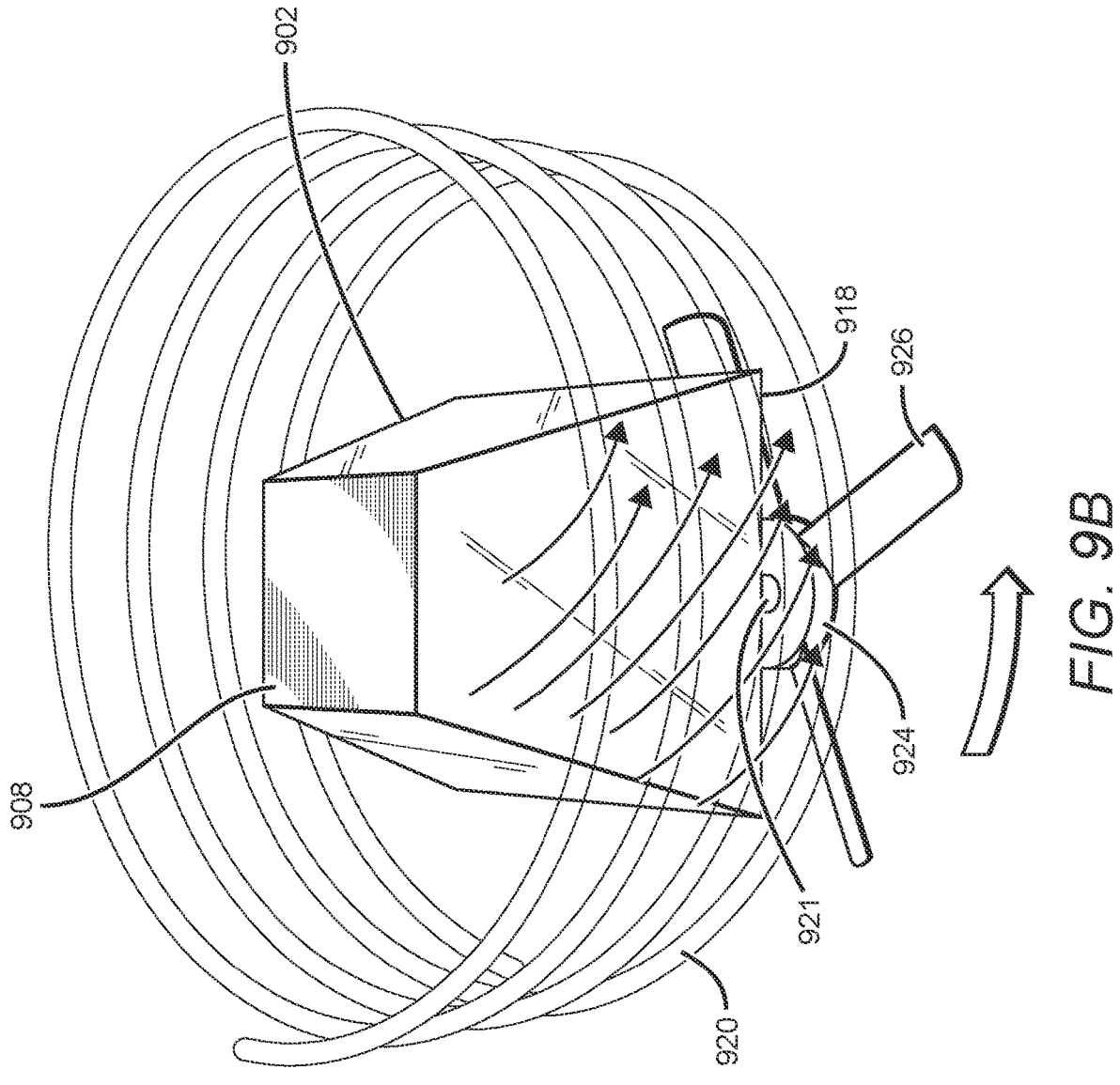
FIG. 9B is a diagram illustrating another example configuration of a rotatable polygon reflector and a fluid circulation device attached to the rotatable polygon reflector to form a fluid circulation surrounding the rotatable polygon reflector, according to some embodiments.

FIG. 9A thus illustrates that polygon reflector 902 can have an integrated fluid circulation device 904 mounted to first rotation axial end 908 (e.g., the top end or top surface) of polygon reflector 902 to form the cyclonic flow 920. Using the configuration of FIG. 9A, a fluid (e.g., the air) is pushed downward in a cyclonic flow. FIG. 9B is a diagram illustrating another example configuration of a rotatable polygon reflector 902 and a fluid circulation device 924 attached to the rotatable polygon mirror 902 at the second rotation axial end 918 (e.g., the bottom end or bottom surface) to form a fluid circulation 920 surrounding the rotatable polygon reflector 902, according to some embodiments. The configuration shown in FIG. 9B is substantially the same as the configuration shown in FIG. 9A, except that fluidic circulation device 924 is attached to the second rotation axial end 918 (e.g., the bottom end) of polygon reflector 902 via a polygon motor axle 921. First and second rotation axial ends 908 and 918 typically are not reflective and not used for optical scanning purposes. Thus, they can be used for mounting the fluid circulation devices without affecting the optical scanning performance.

Using the configuration of FIG. 9B, the cyclonic flow 920 is formed by pulling the fluid downward with device 924. Device 924 can be a fan comprising a plurality of blades 926 (e.g., 4 blades). At least one of the plurality of blades 926 of device 924 is configured to tilt at an angle such that the fluid circulation forms a cyclonic flow 920 from first rotation axial end 908 of the rotatable polygon reflector 902 to a second rotation axial end 918 of the rotatable polygon reflector 902, as indicated by the arrows pointing to the right and from axial end 908 to axial end 918 (i.e., from top left to bottom right). FIG. 9B shows that all blades 926 of fluid device 924 have a tilt angle configured to form the downward cyclonic flow 920. The tilt angles of the blades of fluid circulation device 924 can be customized to any desired value. The tilt angles also affect the horizontal and vertical components of cyclonic flow 920. For instance, when the tilt angle increases, the vertical component of cyclonic flow 920 also becomes larger, resulting in a more rapid downward fluid circulation. If the tile angle of blades 926 decreases, the vertical component becomes smaller, and the cyclonic flow 920 moves downwards in the direction from axial end 908 to axial end 918 more slowly. Other than the blade tilt angle, it is understood that other characteristics of the fluid circulation device 924 can be configured as desired. These characteristics include, for example, a rotational speed, a rotational direction, a blade angle, blade dimensions, a quantity of blades, and a material of the fluid circulation device 924. Similar to those described above, the rotational speed of device 924 and polygon reflector 902 can be configured to be independent or synchronized. The direction of the rotation can be the same or similar for device 924 and 902.

Figure 9C:
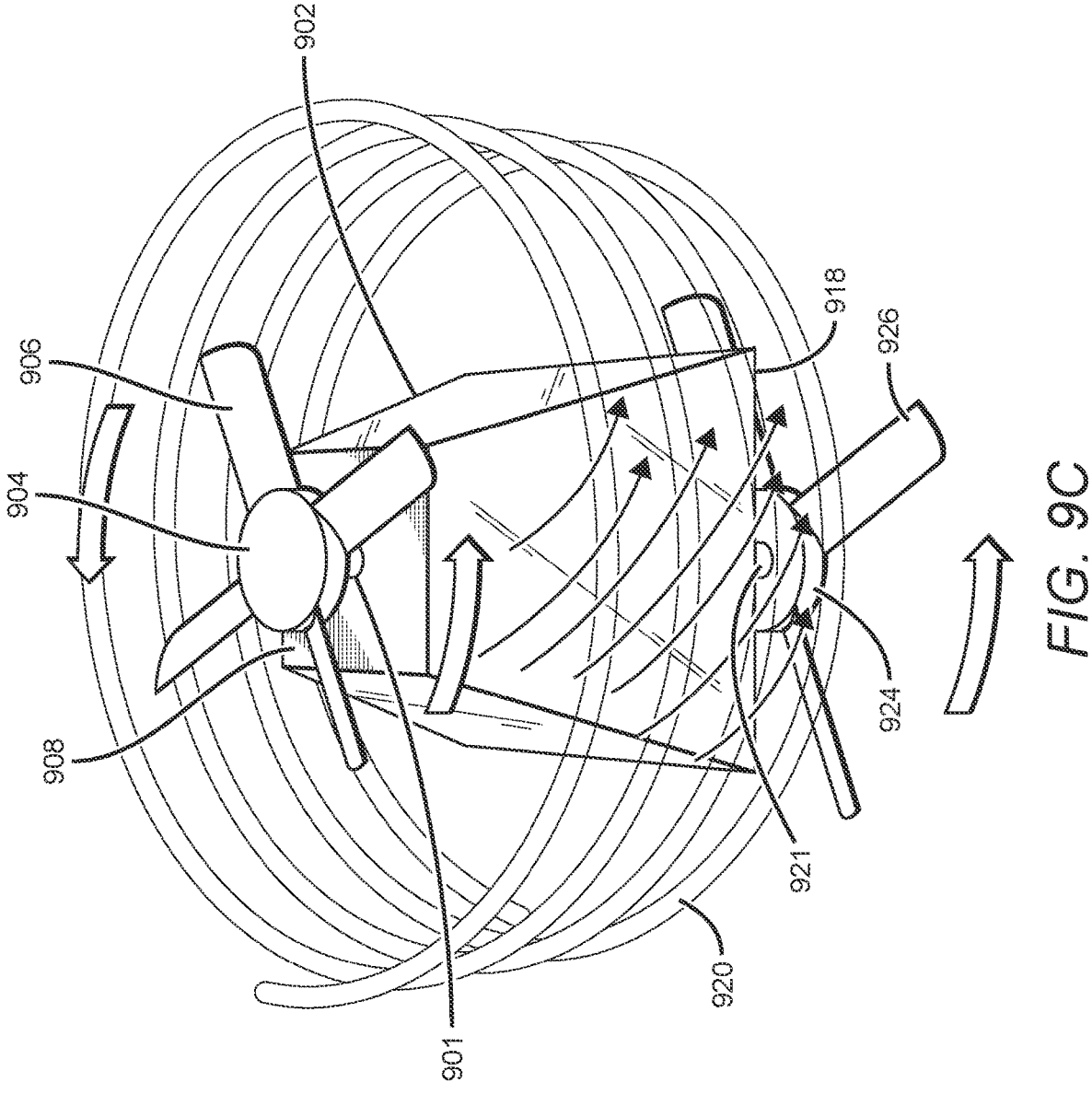
FIG. 9C is a diagram illustrating an example configuration of a rotatable polygon reflector and multiple fluid circulation devices attached to the rotatable polygon mirror to form a fluid circulation surrounding the rotatable polygon reflector, according to some embodiments.

FIG. 9C is a diagram illustrating an example configuration of a rotatable polygon reflector 902 and multiple fluid circulation devices attached to the rotatable polygon reflector 902 to form a fluid circulation surrounding the rotatable polygon reflector 902, according to some embodiments. This configuration shown in FIG. 9C combines the configurations shown in FIGS. 9A and 9B. That is, in this configuration, both fluid circulation devices 904 and 924 are attached to polygon reflector 902, with device 904 being attached to the first rotation axle end 908 and device 924 being attached to the second rotation axle end 918. As a result, the fluid (e.g., air) is simultaneously pushed and pulled downward to form cyclonic flow 920. Because two devices 904 and 924 are used, the cyclonic flow 920 can be an enhanced flow having a higher speed or strength, thereby providing an enhanced flow curtain for reducing polygon noise and for dissipating heat. In addition, because there are two fluid circulation devices, each device can rotate at a lower speed compared to the configurations shown in FIGS. 9A and 9B, wherein only one fluid circulation device is used. In some examples, fluid circulation devices 904 or 924 may be turned on alternately or simultaneously. By using two devices, each of fluidic circulation devices 904 or 924 may have a longer product lifetime and improved reliability.

The device configurations (e.g., the blade tilt angle, the rotational speed, the number of blades, etc.) for fluid circulation devices 904 and 924 in the configuration shown in FIG. 9C can be the same or similar to those described above with respect to FIGS. 9A and 9B. In some embodiments, the devices 904 and 924 are both fans. Devices 904 and 924 can be configured to rotate synchronously to form the fluid circulation surrounding the rotatable polygon reflector 902. For instance, they can be controlled (e.g., by control circuitry 350) to have the substantially the same rotational speed, starting time/stopping time, acceleration rate, number of blades, blade tilt angles, etc. The synchronization between the devices 904 and 924 may further improve the smoothness of the fluid circulation and reduce vortices and wakes. In some examples, the polygon motor axles 901 and 921 may be the same axle, such that devices 904 and 924 rotate together or in a synchronized manner. In other examples, axles 901 and 921 may be different axles. The polygon motor axles 901 and 921 are controlled to rotate the devices 904 and 924, respectively and independently, to form the cyclonic flow 920 from first rotation axial end 908 to second rotation axial end 918. In some examples, fluid circulation devices 904 and/or 924 can share the rotation axle with the polygon reflector 902, e.g., they are mounted to the rotation axle of polygon reflector 902. As a result, there is no need for additional motors to drive the rotation of devices 904 and/or 924. In some examples, when both fluid circulation devices 904 and 924 are attached to polygon reflector 902, one or both devices can be operated. For instance, devices 904 and 924 may or may not be turned on simultaneously. One device may be turned on while the other device remains off. Both devices may be turned on or off simultaneously.

In all configurations shown in FIGS. 9A-9C, the polygon reflector 902 is controlled to rotate in one direction (e.g., the horizontal direction). The fluid circulation devices 904 and/or 924 are controlled to rotate at the same direction as the polygon reflector 902 (e.g., when the devices 904 and/or 924 are mounted to the polygon rotation axle 901 or 921 of polygon reflector 902). Because of the blades of devices 904 and/or 924 have tilt angles, the fluid circulation direction is different from the rotation direction of the reflector 902 and the devices 904/924. That is, the fluid circulation direction has a vertical component such that the fluid flows downward in a cyclonic manner (as indicated by the arrows from top left to bottom right), effectively forming a flow curtain surrounding the polygon reflector 902.

FIGS. 9A-9C show three different configurations of attaching one or more fluid circulation devices to polygon reflector 902. The number of the fluid circulation devices and the position of mounting the device(s) to the polygon reflector 902 can be selected based on performance requirements of the polygon reflector. The fluid used to for form the flow curtain can also be selected from, for example, a gas (e.g., a Helium-based gas, a Neon-based gas, air), a liquid, or a plasma. The housing of polygon reflector 902 can thus be filled with gas, liquid, and/or plasma. The one or more fluidic circulation devices (e.g., 904 and/or 924) can form a flow curtain or flow cover. The polygon reflector 902 can thus be shielded by the flow curtain or flow cover to reduce its interaction with the stagnant air outside of the flow curtain or flow cover.

Figure 10A:
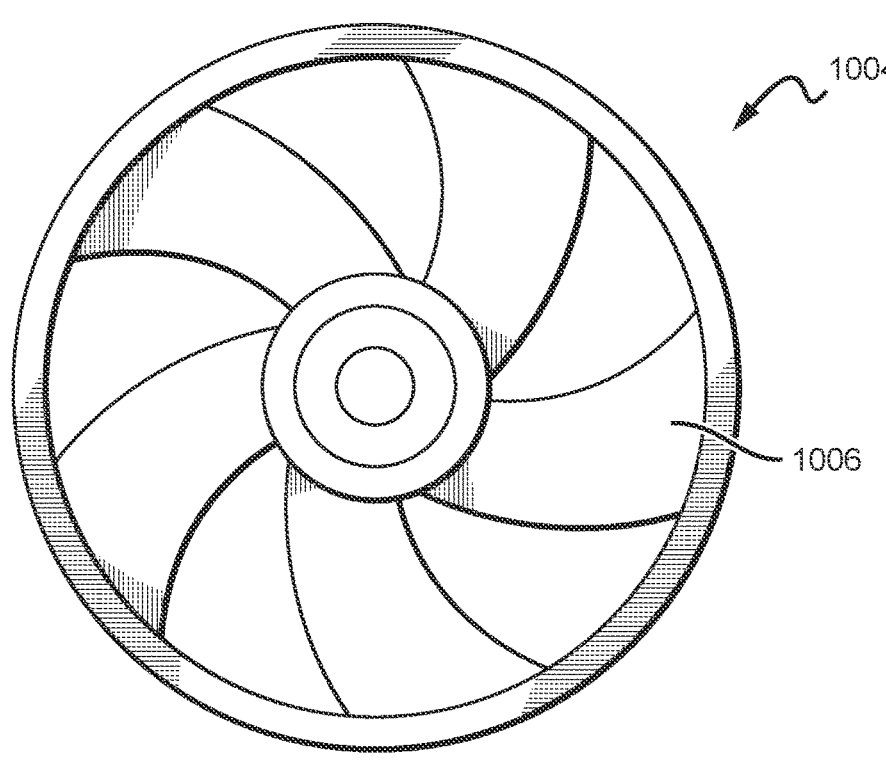
FIG. 10A is a diagram illustrating an example fluid circulation device with cross-flow blades, according to some embodiments.
Figure 10B:
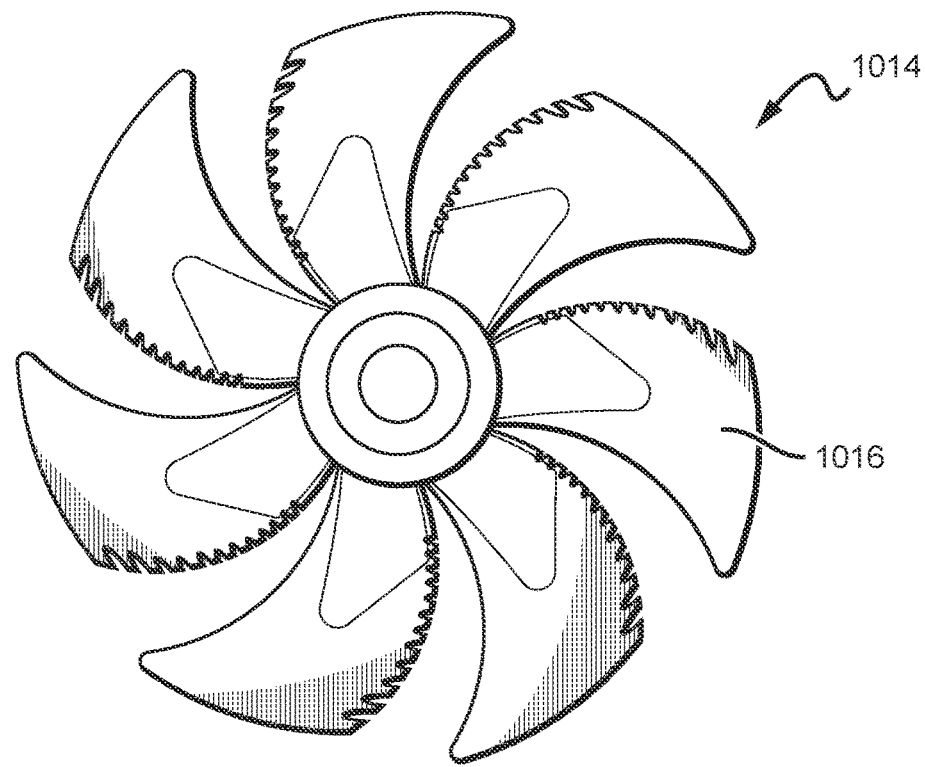
FIG. 10B is a diagram illustrating an example fluid circulation device having blades with edge serrations, according to some embodiments.
Figure 10C:
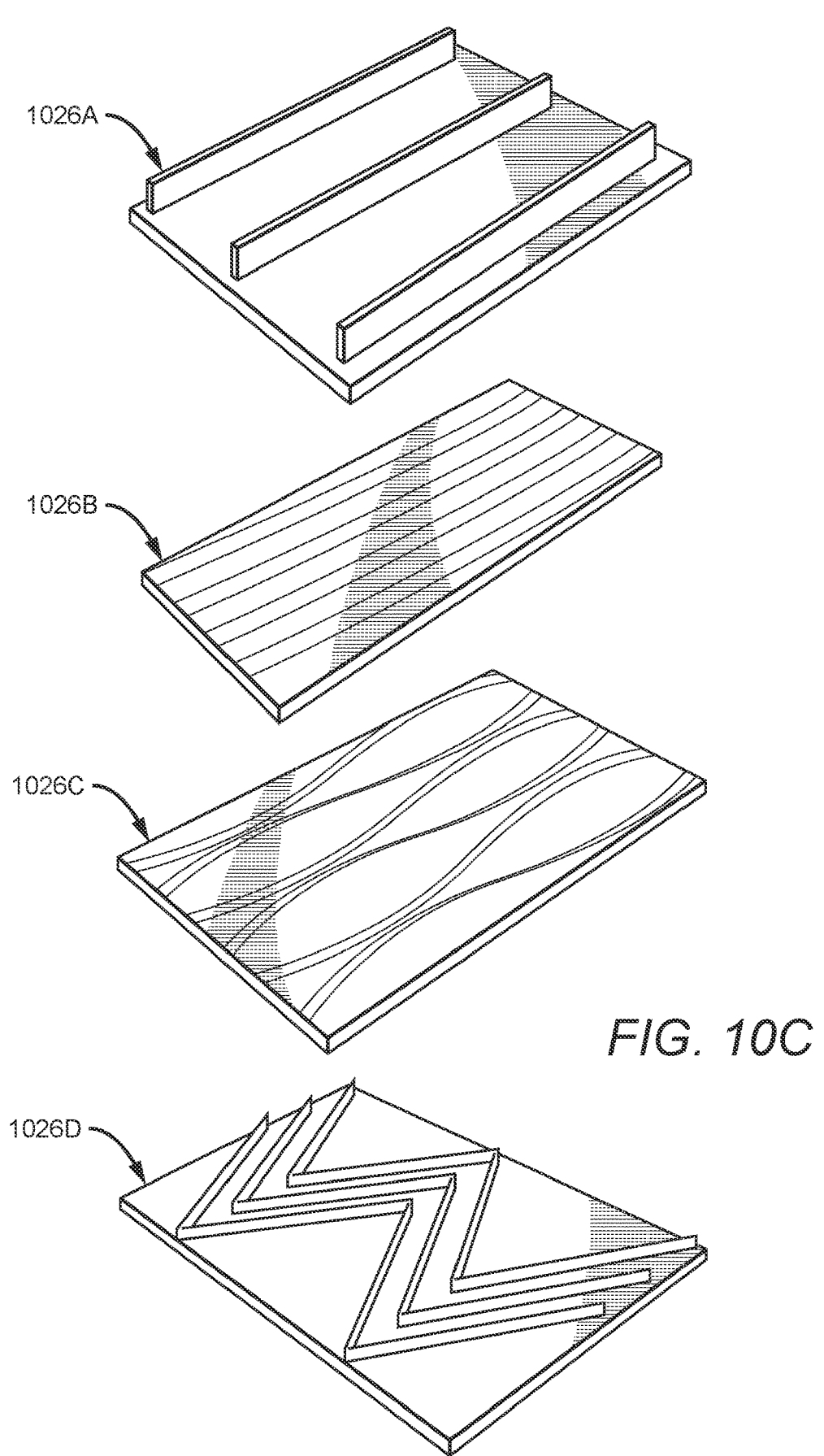
FIG. 10C are diagrams illustrating examples of surface features of blades of a fluid circulation device, according to some embodiments.

The blades of a fluid circulation device (e.g., device 904 or 924) can be configured to have various characteristics for further reducing noise and improving performance. Examples of such various characteristics are shown in FIGS. 10A-10C. FIG. 10A is a diagram illustrating an example fluid circulation device 1004 with cross-flow blades, according to some embodiments. In one example, device 1004 can be a cross-flow fan. In FIG. 10A, a blade 1006 of a fluid circulation device 1004 is shaped such that it creates a laminar fluid flow by drawing the fluid (e.g., air) in over the entire length of the blade. That is, device 1004 with the cross-flow blades, can generate fluid flow that moves tangentially across the blades. Some or all blades of device 1004 may have the cross-flow blades. A cross-flow fan has blades oriented in such a way that the fluid is drawn in axially and expelled tangentially. When the cross-flow fan operates, it pushes the fluid outwards in a radial direction but at the same time, the blade design directs the fluid flow tangentially along the length of a cylindrical housing. This results in a wider and more even stream of the fluid, making device 1004 capable of providing broader, and non-uniform fluid distribution. Typically, a cross-flow fan may have a more compact size than traditional axial or centrifugal fans, making them suitable for LiDAR applications, where space is often limited. The cross-flow fan may also have low noise because they can have a more streamlined fluid flow. A cross-flow fan may also provide a more uniform cooling or fluid distribution and is energy efficient.

FIG. 10B is a diagram illustrating an example fluid circulation device 1014 having blades with edge serrations, according to some embodiments. As shown in FIG. 10B, device 1014 can be a fan. A blade 1016 of device 1014 can have leading and/or trailing edge serrations (FIG. 10B only shows serrations in one edge of blade 1016, but the other edge can have serrations too). Blade edge serrations refer to a feature where small, evenly (or unevenly) spaced notches or teeth are added along the edges of a blade. These serrations are configured into the blade's edge to improve its aerodynamic performance and reduce noise. By implementing the fan blade edge serrations, fluid circulation device 1014 can improve the performance of noise reduction, vortex shedding control, aerodynamics, and reduce blade fatigue. For example, fan blades having edge serrations can reduce noise generated during operation. The notches at the edge of the fan blades disrupt the flow of fluid (e.g., air) and minimize the generation of turbulence, which can be a major source of noise in fan blades. Serrations can also help control the shedding of vortices from the blade edges. As described above, vortices can lead to noise, vibrations, and other performance issues. Serrations modify the flow patterns around the blade's edge, reducing the intensity of these vortices. Moreover, serrated blade edges can enhance the overall aerodynamic efficiency of fan blades. They help reducing separation of fluid flow and stall conditions by preventing large areas of separated flow along the blade surface. Serrations can also lead to increased fan performance, including better thrust or fluid handling capabilities, while maintaining or improving energy efficiency. Furthermore, serrated blades may experience less fatigue over time due to the controlled flow patterns and reduced turbulence. It is understood that the size, shape, and distribution of the serrations on a fan blade may be optimized to achieve the desired results based on the polygon reflector performance requirements and noise reduction requirements.

FIG. 10C are diagrams illustrating examples of various surface features 1026A-1026D of fan blades of a fluid circulation device, according to some embodiments. As shown in FIG. 10C, these surface features can form various surface veins, patterns, channels, etc. to improve the fluid flow and to further reduce noise. For instance, surface feature 1026A include several fluid channels formed by straight strips or bars mounted to the surface of a blade. Surface feature 1026B also includes fluid channels but the width of the channels is narrow compared to that of surface feature 1026A. Surface feature 1026C illustrates a surface pattern having curved strips mounted to the surface of a blade to form a specifically desired fluid flow. And surface feature 1026D illustrates a surface pattern having zigzag strips for directing the fluid flow accordingly. Surface features on fan blades, such as those shown in FIG. 10C, are added to the surface of the blades to improve their aerodynamic performance. These features (e.g., 1026A-1026D) can take various forms and are designed to manipulate the fluid flow (e.g., airflow) around the fan blades. Surface features can be configured to reduce drag, control boundary layer separation, and enhance overall fan or blade efficiency.

In one example, surface features can be surface veins or channels that are designed to reduce the drag created by the blades as they move through the fluid (e.g., air). By controlling the fluid flow over the blade surface, these features can decrease the resistance encountered during rotation. Surface features forming veins or channels are effective in controlling and reducing the boundary layer separation that can occur on the blade surfaces. Moreover, by manipulating the fluid flow and reducing turbulence, surface veins or channels can lead to increased overall aerodynamic efficiency, which is important for various applications including the LiDAR application. It is understood that the shape, size, and distribution of surface features (e.g., veins or channels) can vary widely and not limited to those shown in FIG. 10C. They can take the form of small ribs, slots, or even complex geometries, depending on the desired aerodynamic effects.

FIGS. 10A-10C show various fan blades characteristics that can be implemented to any blade-based fluid circulation devices (e.g., devices 804, 824, 904, and 924). In some examples, a blade-less circulation device can be used to form a fluid circulation around a polygon reflector. A blade-less fluid circulation device has no blades. One type of the blade-less fluid circulation device is a blade-less fan also referred to as an "fluid multiplier" (e.g., an air multiplier). Instead of using rotating blades to generate a fluid flow or circulation, blade-less fans use a different mechanism to create a smooth and focused stream of fluid. In some examples, blade-less fans operate based on the principles of fluid entrainment and fluid amplification. Using air as an example, a blade-less fan can draw in surrounding air and amplify it before expelling it in a directed stream. The fan's base or any part of the fan can contain a motor that sucks air in and accelerates the air through a narrow slit or ring. The accelerated air is expelled out of the slit or ring, creating a high-velocity jet of air. This fast-moving air induces a surrounding flow of air, effectively drawing in more air from the surroundings, which is then combined with the primary jet of air. The result is a continuous and smooth stream of air that is more focused and less turbulent than that produced by traditional fans with blades. Blade-less fans can produce a consistent and non-buffeting fluid flow. Blade-less fans are also often energy-efficient.

Figure 11:
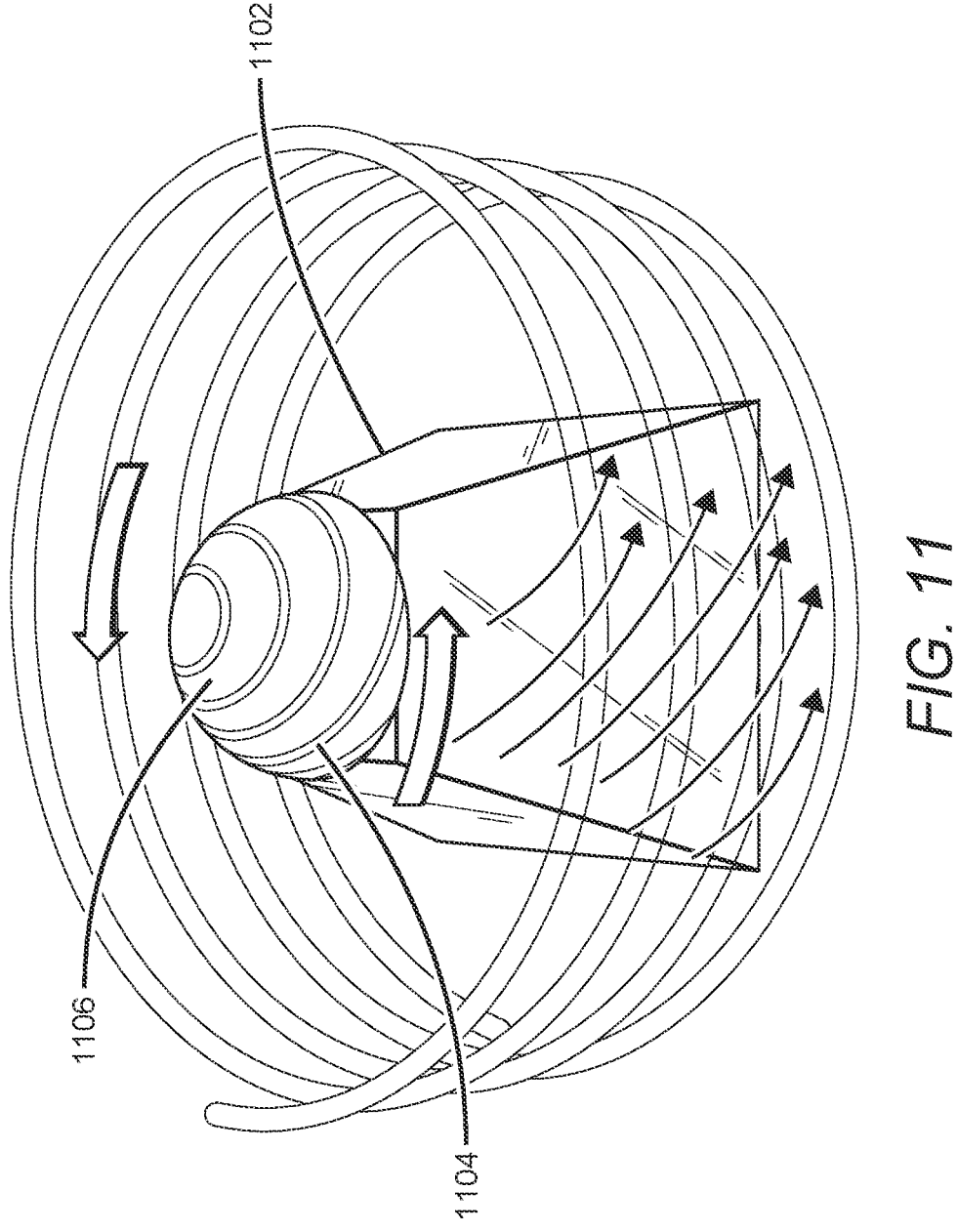
FIG. 11 is a diagram illustrating another example configuration of a rotatable polygon reflector and a fluid circulation devices forming a part of the rotatable polygon reflector to form a fluid circulation surrounding the rotatable polygon reflector, according to some embodiments.

FIG. 11 shows another type of a blade-less fluid circulation device. FIG. 11 is a diagram illustrating an example configuration of a rotatable polygon reflector 1102 and a fluid circulation device 1104 forming a part of the rotatable polygon reflector 1102 to form a fluid circulation surrounding the rotatable polygon reflector 1102, according to some embodiments. Device 1104 is blade-less fan. As illustrated in FIG. 11, polygon reflector 1102 is mounted with, or integrated with, device 1104. Device 1104 may be a separate piece from polygon reflector 1102 and is detachable from polygon reflector 1102. Device 1104 may also be integrated with polygon reflector 1102, thereby forming an integral piece with polygon reflector 1102. As shown in FIG. 11, device 1104 may be a part of the polygon reflector 1102 that bulges upward.

In one example, device 1104 has no fan blades, and therefore is a blade-less circulation device. Instead, one or more fluid flow channels 1106 can be implemented in device 1104. Channels 1106 can be used to guide and transport fluid such as air, gas, liquid, plasma, or a combination thereof. For example, as shown in FIG. 11, when polygon reflector 1102 rotates, device 1104 also rotates because it is mounted to, or integrated with, polygon reflector 1102. As device 1104 rotates, a fluid (e.g., air) may enter to the channel 1106 located at the top portion of device 1104, and is guided by channels 1106 to flow downward along the spiral shaped channels 1106. As a result, when polygon reflector 1102 rotates, a cyclonic flow of the fluid can be formed to provide a flow curtain or flow cover surrounding polygon reflector 1102.

In one example, to enhance the fluid flow surrounding polygon reflector 1102, device 1104 may include a motor (e.g., located inside device 1104, polygon reflector 1102, or another part of the LiDAR system, not shown) that sucks the fluid (e.g., air) in through an opening (e.g., located at the top portion of device 1104, not shown) and accelerates the fluid through a narrow slit, ring, or the spiral shaped channels 1106. Spiral shaped channels 1106 can have narrow opening for the accelerated fluid to be pushed out from inside of device 1104. The accelerated air is expelled out of the slit, ring, or the spiral shaped channels 1106, creating a high-velocity jet of fluid. This fast-moving fluid induces a surrounding flow of fluid, effectively drawing in more fluid from the surroundings, which is then combined with the primary jet of fluid. The result is a continuous and smooth stream of fluid that is more focused and less turbulent than that produced by traditional fans with blades.

In some embodiments, fluid circulation device 1104 may comprise a half spherical or half flattened spherical dome shape, with a sharp tip, a rounded tip, or a funnel tip. Additionally, channels 1106 may not be needed. As device 1104 rotates, it may draw fluid downward by the Coanda effect, which is the tendency of a jet of fluid emerging from an orifice to follow an adjacent flat or curved surface and to entrain fluid from the surroundings so that a region of lower pressure develops. Therefore, device 1104 is not limited to the configuration shown in FIG. 11, and can have other configurations.

A blade-less fluid circulation device (e.g., device 1104) can thus also are configured such that the fluid circulation forms a fluid flow curtain that reduces fluid interaction between the rotatable polygon reflector 1102 and external environment. For instance, the characteristics of the blade-less fluid circulation device 1104 are configurable and may include the size of the device 1104 (e.g., height, diameter, etc.), the size of the fluid flow channels 1106 (e.g., width, shape, number, depth, etc. of the channels 1106), the size and location of an opening to sucking in fluid, the rotation speed, acceleration rate, rotation direction, fluid intake force, fluid compression designs, etc.

Figure 12:
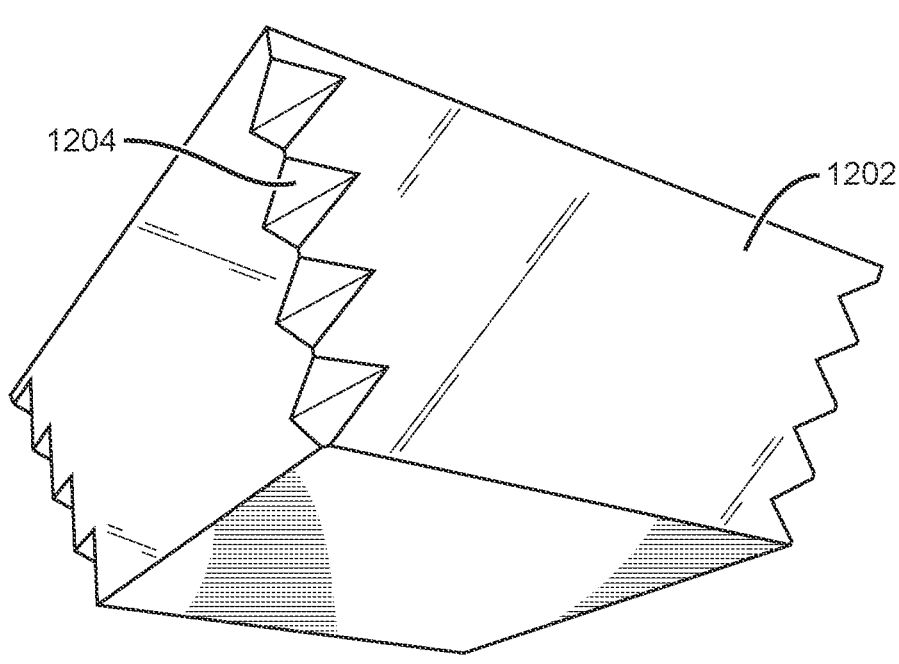
FIG. 12 is a diagram illustrating an example rotatable polygon reflector having edge grooves for forming fluid flow channels, according to some embodiments.

FIG. 12 is a diagram illustrating an example rotatable polygon reflector 1202 having edge grooves 1204 for forming fluid channels, according to some embodiments. As described above with respect to FIG. 7, one of the reasons that a polygon reflector causes vortices and wakes when it rotates is the difference in air pressure in the area in front of the polygon facet in the direction of the rotation and in the area behind the polygon facet. That is, the air pressure at the area in front of a polygon facet in the direction of the rotation is high and the air pressure at the area behind a polygon facet is low. The air pressure difference is caused by the straight edge between two adjacent facets of the polygon reflector.

These edge grooves 1204 can be configured into the polygon reflector 1202's edges to improve its aerodynamic performance and reduce noise. By implementing the edge grooves 1204, polygon reflector 1202 can improve the performance of noise reduction, vortex shedding control, and aerodynamics, with or without using a separate fluid circulation device such as those described above. For example, polygon reflector 1202 having edge grooves 1204 can reduce noise generated during operation. The grooves 1204 at the edge of the polygon reflector 1202 disrupt the fluid flow (e.g., air flow) and reduce the pressure difference between the area in front of the edge and behind the edge. Therefore, the edge grooves 1204 can minimize the generation of turbulence (vortices and wakes), which is a major source of noise. Edge grooves can also help control the shedding of vortices from the polygon reflector 1202's edges. As described above, vortices can lead to noise, vibrations, and other performance issues. The edge grooves 1204 modify the flow patterns around the polygon reflector's edges, reducing the intensity of these vortices. Moreover, edge grooves 1204 can enhance the overall aerodynamic efficiency of polygon reflector 1202. Edge grooves 1204 can also lead to increased fluid flow performance, including better thrust or fluid handling capabilities, while maintaining or improving energy efficiency. Furthermore, polygon reflector 1202 may experience less fatigue over time due to the controlled flow patterns and reduced turbulence, particular due to the reduced pressure difference around the edges. It is understood that the size, shape, and distribution of the edge grooves 1204 are not limited to that shown in FIG. 12, and may be configured to achieve the desired results based on the polygon reflector's performance requirements and noise reduction requirements. A polygon reflector with edge grooves can be used with or without a separate fluid circulation device (e.g., device 804, 824, 904, 924, and 1104).

Figure 13:
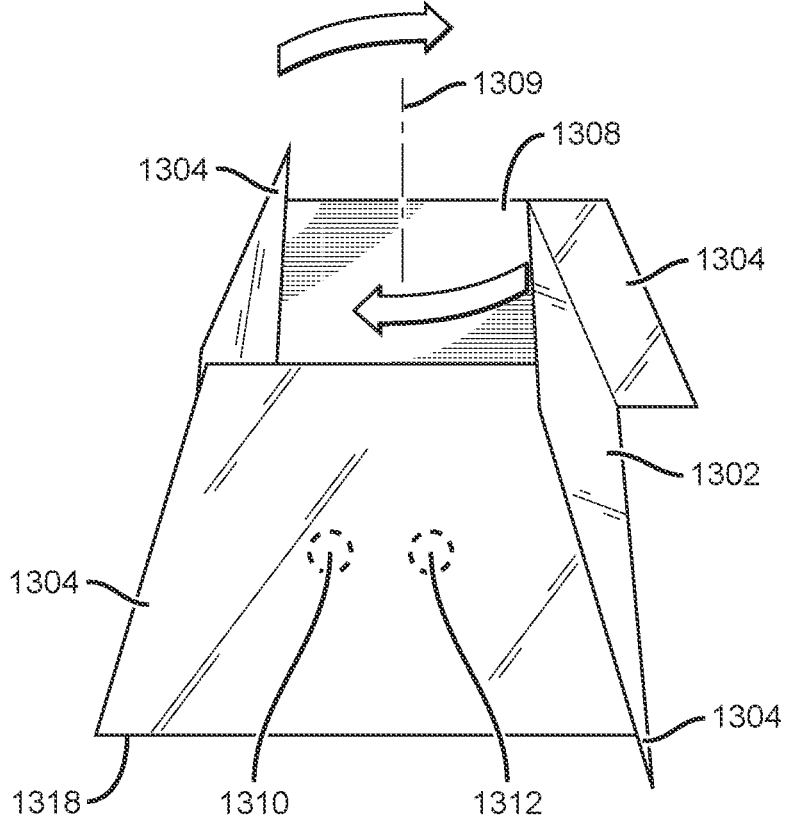
FIG. 13 is a diagram illustrating an example rotatable polygon reflector having extended facets for forming a fluid circulation surrounding the rotatable polygon reflector, according to some embodiments.

FIG. 13 is a diagram illustrating an example rotatable polygon reflector 1302 having extended reflective facets 1304 for forming a fluid circulation surrounding the rotatable polygon reflector 1302, according to some embodiments. As shown in FIG. 13, similar to those polygon reflectors described above (e.g., 802, 902, 1102, 1202), polygon reflector 1302 has a plurality of reflective facets 1304 for directing light. FIG. 13 shows four such facets 1304. Unlike the other polygon reflectors, each of the facets 1304 of polygon reflector 1302 has an extend portion. The extended portions of the facets 1304 extend outside the body of the polygon reflector 1302, thereby effectively forming fan blades when polygon reflector 1302 rotates. For example, when polygon reflector 1302 operates, the extended portions of facets 1304 can form a fluid circulation surrounding the polygon reflector 1302. The rotatable polygon reflector 1302 with extended facets 1304 can create more efficient fluid movement and also create a vacuum channel behind an extended facet 1304 in the rotational direction of polygon reflector 1302. By having the extended facets 1304, the high pressure zone in front of an edge of the polygon reflector 1302 in its rotational direction is removed. Moreover, by using extended facets 1304, other fluid circulation devices (e.g., 804, 824, 902, 924, 1104) may not be needed (although they could be combined depending on the performance requirements). Thus, polygon reflector 1302 with extended facets 1304 can effectively create a flow curtain or flow cover to reduce noise.

As shown in FIG. 13, the facets 1304 of polygon reflector 1302 are tilted. That is, the normal direction of each facet 1304 forms a tilt angle with respect to the rotation axis 1309 of polygon reflector 1302. Rotation axis 1309 is perpendicular to the first rotation axle end 1308 (or second rotation axle end 1318) of polygon reflector 1302. Axle end 1308 can be the top end or top surface of polygon reflector 1302. The tilt angle between the normal direction of each facet 1304 and rotation axis 1309 is not 90 degrees. In other words, the facets 1304 are not parallel to the rotation axis 1309. This type of polygon reflector 1302 is referred to as a wedge-shaped polygon reflector. FIG. 13 shows that the reflective facets 1304 are tilted such that the tilt angles of the facets 1304 are acute angles. It is understood that the tilt angles of the reflective facets 1304 can also be obtuse angles, and therefore the facets 1304 would be facing downwards. Such a polygon reflector is shown as reflector 1202 in FIG. 12.

With reference back to FIG. 13, a wedge-shaped polygon reflector 1302 having extended reflective facets 1304 can cause cyclonic flow of the fluid from one rotation axle end of the reflector 1302 to another end. For example, if facets 1304 of the polygon reflector 1302 has an acute tile angle, as shown in FIG. 13, the fluid circulation caused by the extended portions of facets 1304 has a vertical component that points downward from first rotation axle end 1308 to second rotation axle end 1318 when polygon reflector 1302 rotates in the direction as shown in FIG. 13. As another example, if the facets 1304 of the polygon reflector 1302 has an obtuse tile angle, the fluid circulation caused by the extended portions of facets 1304 has a vertical component that points upward from second rotation axle end 1318 to first rotation axle end 1308 when polygon reflector 1302 rotates in the direction as shown in FIG. 13. If the rotation direction of polygon reflector 1302 changes, the direction of the fluid circulation may change too. The cyclonic flow of the fluid surrounding the reflector polygon 1302 thus forms a flow curtain or flow cover for reducing the vortices and wakes, and thus further reduces the noise.

While FIG. 13 shows that the facets 1304 have straight edges and corners, it is understood that the edges do not need to be straight (e.g., can have serrations, or curved, or has a cross-flow shape, etc.) and the corners can be chamfered or rounded. Other features (e.g., those surface features described above) can also be combined with the extended portions of the facets 1304 to further smooth the fluid circulation and reduce the polygon reflector's rotation noise. Any such features are configured such that they may not interfere with the optical characteristics of the reflective facets.

In one example, as shown in FIG. 13, the entire facet 1304 (including the extended portion) may be used to reflect light. As a result, the optical aperture center of the reflective facet 1304 may be shifted from position 1312 to position 1310. Correspondingly, transmitters, receivers, optics, and/or other components of the LiDAR system may need to be adjusted based on the shift of the optical aperture center position of reflective facet 1304.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. As one example, a fluid circulation device 904 shown in FIG. 9A can be combined with the embodiment of using the extended facets 1304 shown in FIG. 13. Similarly, fluid circulation device 1104 with fluid flow channels 1106 shown in FIG. 11 can be combined with the embodiment of using the extended facets 1304 shown in FIG. 13. Furthermore, any embodiments shown in FIGS. 8A-8C, 9A-9C, 11, 12, and 13 can be combined with any embodiments shown in FIGS. 10A-10C (e.g., including edge serrations, surface veins, surface channels, etc.). Any such combinations of embodiments can be implemented to further improve aerodynamics of the polygon reflector, and in turn reduce noise.

What is claimed is:

1. An optical scanning device for light ranging and detection (LiDAR), the device comprising:
   a rotatable polygon reflector having a plurality of reflective facets, the rotatable polygon reflector being configured to rotate about a first rotation axis in a first rotation direction;
   a polygon motor axle mounted to the rotatable polygon reflector, the polygon motor axle being configured to cause the rotatable polygon reflector to rotate about the first rotational axis; and
   one or more fluid circulation devices disposed alongside, attached to, or forming a part of the rotatable polygon reflector, wherein the one or more fluid circulation devices are configured to rotate about a second rotation axis to form a fluid circulation surrounding the plurality of reflective facets of the rotatable polygon reflector, the fluid circulation being at least partially in the first rotation direction.

2. The device of claim 1, wherein the rotatable polygon reflector further comprises a first rotation axial end and a second rotation axial end, and wherein the plurality of reflective facets comprises four or more reflective facets disposed between the first and second rotation axial ends, the four or more reflective facets being configured to scan light to a field-of-view.

3. The device of claim 1, wherein the one or more fluid circulation devices comprise a first fan disposed alongside the plurality of reflective facets of the rotatable polygon reflector, the first fan being detached from the rotatable polygon reflector.

4. The device of claim 3, wherein the one or more fluid circulation devices comprise one or more additional fans disposed alongside the plurality of reflective facets of the rotatable polygon reflector, the first fan and the one or more additional fans are spaced apart from one another.

5. The device of claim 4, wherein the first fan and the one or more additional fans are evenly distributed alongside the plurality of reflective facets of the rotatable polygon reflector.

6. The device of claim 1, further comprising a housing having an opening, wherein the rotatable polygon reflector is disposed in the housing and configured to scan light to a field-of-view via the opening.

7. The device of claim 6, wherein at least one of the one or more fluid circulation devices is disposed outside of the housing, the at least one of the one or more fluid circulation devices being configured to direct a fluid flow via the opening along a tangential direction to the first rotation direction of the rotatable polygon reflector.

8. The device of claim 1, wherein one or more characteristics of the one or more fluid circulation devices are configured such that the fluid circulation forms a fluid flow curtain that reduces fluid interaction between the rotatable polygon reflector and external environment.

9. The device of claim 8, wherein the one or more characteristics of the one or more fluid circulation devices comprise one or more of:

a rotational speed, a rotational direction, a blade angle, blade dimensions, a quantity of blades, a material of the one or more fluid circulation devices, and a quantity of the one or more fluid circulation devices.

10. The device of claim 1, wherein the one or more fluid circulation devices comprise a first fan attached to a first rotational axial end of the rotatable polygon reflector, the first fan being configured to rotate at the first rotation direction of the rotatable polygon reflector.

11. The device of claim 1, wherein a first fan is mounted to the polygon motor axle such that the first fan rotates at the same rotational speed as the rotatable polygon reflector.

12. The device of claim 10, wherein the first fan is configured to rotate independently from the rotatable polygon reflector.

13. The device of claim 10, wherein the first fan comprises a plurality of blades, at least one of the plurality of blades of the first fan being configured to tilt at an angle such that the fluid circulation forms a cyclonic flow from the first rotational axial end of the rotatable polygon reflector to a second rotational axial end of the rotatable polygon reflector.

14. The device of claim 10, further comprising a second fan attached to a second rotation axial end of the rotatable polygon reflector, the second rotation axial end being opposite to the first rotation axial end, the second fan being configured to rotate at the first rotation direction of the rotatable polygon reflector.

15. The device of claim 14, wherein the first fan and the second fan are configured to rotate synchronously to form the fluid circulation surrounding the plurality of reflective facets of the rotatable polygon reflector.

16. The device of claim 15, wherein the first fan and the second fan are configured to rotate at the same rotational speed.

17. The device of claim 15, wherein the second fan comprises a plurality of blades, at least one of the plurality of blades of the second fan being configured to tilt at an angle such that the first fan and the second fan synchronously form a cyclonic flow from one rotational axial end of the rotatable polygon reflector to another rotational axial end of the rotatable polygon reflector.

18. The device of claim 1, wherein a direction of the fluid circulation is different from the first rotation direction of the rotatable polygon reflector.

19. The device of claim 1, further comprising a housing of the rotatable polygon reflector, the housing being filled with gas, liquid, plasma, or a combination thereof.

20. The device of claim 1, wherein the one or more fluid circulation devices comprise at least one blade-based circulation device.

21. The device of claim 1, wherein the one or more fluid circulation devices comprise at least one blade-less circulation device.

22. The device of claim 21, wherein the at least one of the blade-less circulation device comprises fluid flow channels configured to guide and transport a fluid to form the fluid circulation.

23. The device of claim 1, wherein the rotatable polygon reflector comprises edge grooves in at least one edge of the rotatable polygon reflector.

24. A light ranging and detection (LiDAR) system comprising an optical scanning device, the optical scanning device comprises:

a rotatable polygon reflector having a plurality of reflective facets, the rotatable polygon reflector being configured to rotate about a first rotation axis in a first rotation direction;

a polygon motor axle mounted to the rotatable polygon reflector, the polygon motor axle being configured to cause the rotatable polygon reflector to rotate about the first rotational axis; and one or more fluid circulation devices disposed alongside, attached to, or forming a part of the rotatable polygon reflector, wherein the one or more fluid circulation devices are configured to rotate about a second rotation axis to form a fluid circulation surrounding the plurality of reflective facets of the rotatable polygon reflector, the fluid circulation being at least partially in the first rotation direction.

25. A vehicle comprising a light ranging and detection (LiDAR) system comprising an optical scanning device, the optical scanning device comprises:

a rotatable polygon reflector having a plurality of reflective facets, the rotatable polygon reflector being configured to rotate about a first rotation axis in a first rotation direction;

a polygon motor axle mounted to the rotatable polygon reflector, the polygon motor axle being configured to cause the rotatable polygon reflector to rotate about the first rotational axis; and one or more fluid circulation devices disposed alongside, attached to, or forming a part of the rotatable polygon reflector, wherein the one or more fluid circulation devices are configured to rotate about a second rotation axis to form a fluid circulation surrounding the plurality of reflective facets of the rotatable polygon reflector, the fluid circulation being at least partially in the first rotation direction.

* * * * *